US012760941B2

(12) United States Patent
Langer et al.

(10) Patent No.: US 12,760,941 B2
(45) Date of Patent: Oct. 13, 2026

(54) COOLING SYSTEM AND LABORATORY INSTRUMENT HAVING A COOLING SYSTEM

(71) Applicant: Thermo Electron LED GmbH, Langenselbold (DE)

(72) Inventors: Daniel Langer, Osterode (DE); Kai Peitzberg, Osterode (DE)

(73) Assignee: Thermo Electron LED GmbH, Langenselbold (DE)

( * ) Notice: Subject to any disclaimer, the term of this patent is extended or adjusted under 35 U.S.C. 154(b) by 119 days.

(21) Appl. No.: 18/953,283

(22) Filed: Nov. 20, 2024

(65) Prior Publication Data

US 2025/0189176 A1 Jun. 12, 2025

Related U.S. Application Data

(63) Continuation of application No. 17/936,108, filed on Sep. 28, 2022, now Pat. No. 12,188,704.

(30) Foreign Application Priority Data

Sep. 30, 2021 (DE) ......................... 102021125446.9

(51) Int. Cl.
*F25B 9/10* (2006.01)
*B04B 15/02* (2006.01)
(Continued)

(52) U.S. Cl.
CPC ................ *F25B 9/10* (2013.01); *B04B 15/02* (2013.01); *F25B 9/008* (2013.01); *F25B 41/33* (2021.01);
(Continued)

(58) Field of Classification Search
CPC .. F25B 9/10; F25B 9/008; F25B 41/33; F25B 43/006; F25B 2313/001; F25B 2400/23;
(Continued)

(56) References Cited

U.S. PATENT DOCUMENTS 5,509,881 A 4/1996 Sharples
6,923,011 B2 8/2005 Manole
(Continued)

FOREIGN PATENT DOCUMENTS

CN 101568769 A 10/2009
CN 101688698 A 3/2010
(Continued)

OTHER PUBLICATIONS

U.S. Appl. No. 17/936,108, filed Sep. 28, 2022.
(Continued)

*Primary Examiner* — Kun Kai Ma
(74) *Attorney, Agent, or Firm* — BakerHostetler

(57) ABSTRACT

The application relates to a cooling system, the cooling system having: an evaporator, a first compressor, a second compressor, a cooling component, an expansion device and a line system that connects the evaporator, the first compressor, the second compressor, the cooling component and the expansion device to one another. The cooling system includes a refrigerant, wherein the refrigerant comprises carbon dioxide. The first compressor and the second compressor are arranged in series with one another. The application also relates to a corresponding laboratory instrument.

12 Claims, 16 Drawing Sheets

(51) Int. Cl.

| | |
|---|---|
| ***F25B 9/00*** | (2006.01) |
| ***F25B 41/33*** | (2021.01) |
| ***F25B 43/00*** | (2006.01) |

(52) U.S. Cl.
CPC ...... *F25B 43/006* (2013.01); *F25B 2313/001* (2013.01); *F25B 2400/23* (2013.01); *F25B 2600/2513* (2013.01); *F25B 2700/21175* (2013.01)

(58) Field of Classification Search
CPC .... F25B 2600/2513; F25B 2700/21175; F25B 40/02; F25B 2400/13; F25B 2600/2509; F25B 2700/195; F25B 2700/197; F25B 2700/21163; F25B 2700/21174; F25B 1/10; B04B 15/02
See application file for complete search history.

(56) References Cited

U.S. PATENT DOCUMENTS

| | | | |
|---|---|---|---|
| 7,096,679 | B2 | 8/2006 | Manole |
| 7,155,925 | B2 | 1/2007 | Yamasaki et al. |
| 8,671,703 | B2 | 3/2014 | Mitra et al. |
| 11,162,714 | B2 | 11/2021 | Haack et al. |
| 2010/0058781 | A1 | 3/2010 | Lifson et al. |
| 2017/0209874 | A1 | 7/2017 | Hornek et al. |
| 2021/0252526 | A1 | 8/2021 | Müller et al. |

FOREIGN PATENT DOCUMENTS

| | | | | | |
|---|---|---|---|---|---|
| CN | 105737427 | A | | 7/2016 | |
| CN | 110319612 | A | | 10/2019 | |
| CN | 110618084 | A | | 12/2019 | |
| EP | 0 295 377 | A2 | | 12/1988 | |
| EP | 3 015 791 | A1 | | 5/2016 | |
| EP | 3 479 903 | A1 | | 5/2019 | |
| JP | 2991453 | B2 | | 12/1999 | |
| JP | 2004-144343 | A | | 5/2004 | |
| JP | 2004-293958 | A | | 10/2004 | |
| JP | 2010127563 | A | * | 6/2010 | .............. F25B 41/39 |
| JP | 2011-255330 | A | | 12/2011 | |
| JP | 2014-5977 | A | | 1/2014 | |
| JP | 2018-71909 | A | | 5/2018 | |
| JP | 2020-153651 | A | | 9/2020 | |
| JP | 2021-134953 | A | | 9/2021 | |
| RU | 2249773 | C2 | | 4/2005 | |

OTHER PUBLICATIONS

First Office Action in Chinese Application No. 202211143917.8, dated Nov. 15, 2025, 20 pages with English Translation.

Extended European Search Report for European Application No. 22196688.0, mailed Feb. 1, 2023, 18 pages w/ Machine Translation.

* cited by examiner

COOLING SYSTEM AND LABORATORY INSTRUMENT HAVING A COOLING SYSTEM

CROSS REFERENCE TO RELATED APPLICATIONS

This application is a continuation of now-allowed U.S. patent application Ser. No. 17/936,108 (filed Sep. 28, 2022); which claims priority to and the benefit of German patent application no. DE 102021125446.9 (filed Sep. 30, 2021). All foregoing applications are incorporated herein by reference in their entireties for any and all purposes.

TECHNICAL FIELD

The present disclosure relates to the field of laboratory instruments and to the field of cooling systems.

BACKGROUND

The present invention relates to a cooling system that can be used to cool or regulate the temperature of an apparatus. In particular, the present invention relates to a cooling system for use in laboratory instruments. Furthermore, the present invention relates to laboratory instruments, comprising, but not limited to, centrifuges, incubators, and biological safety cabinets.

It is known to cool laboratory instruments, for example centrifuges, by means of a cooling system or to regulate the temperature of the laboratory instrument (for example the centrifuge). Corresponding cooling systems usually have an evaporator, a compressor, a cooling component and an expansion device, which are connected to one another in a circuit via a line system. Such a cooling system is operated with a refrigerant that undergoes changes of state in the circulation system and therefore draws heat from the environment at one process point (typically at the evaporator) and gives off heat to the environment at another process point (typically at the cooling component). At the cooling component, heat is extracted from the refrigerant in the system, i.e., the refrigerant is cooled (for example by means of a fan).

While the cooling systems, in particular for laboratory instruments, have proven themselves in the prior art in many respects, they have some shortcomings or disadvantages. These relate, for example, to safety, environmental compatibility, user-friendliness and the area of application of the cooling system. Accordingly, there is a long-felt need in the art for improved cooling systems for laboratory instruments.

SUMMARY

It is an object of the present invention to overcome or at least mitigate the shortcomings or disadvantages of the prior art. In particular, it is therefore an object of the present disclosure to provide a cooling system, for example for a laboratory instrument, that is improved at least with regard to one of the aspects of safety, environmental compatibility, user-friendliness, and breadth of the area of application. Preferably, the cooling system is improved with regard to several of these aspects.

In one aspect, the present disclosure provides a laboratory instrument having a cooling system, wherein the cooling system comprises: an evaporator; a first compressor; a second compressor; a cooling component; an expansion device; and a line system that connects the evaporator, the first compressor, the second compressor, the cooling component and the expansion device to one another, wherein the cooling system includes a refrigerant, wherein the refrigerant comprises carbon dioxide, and wherein the first compressor and the second compressor are arranged in series with one another.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1A:
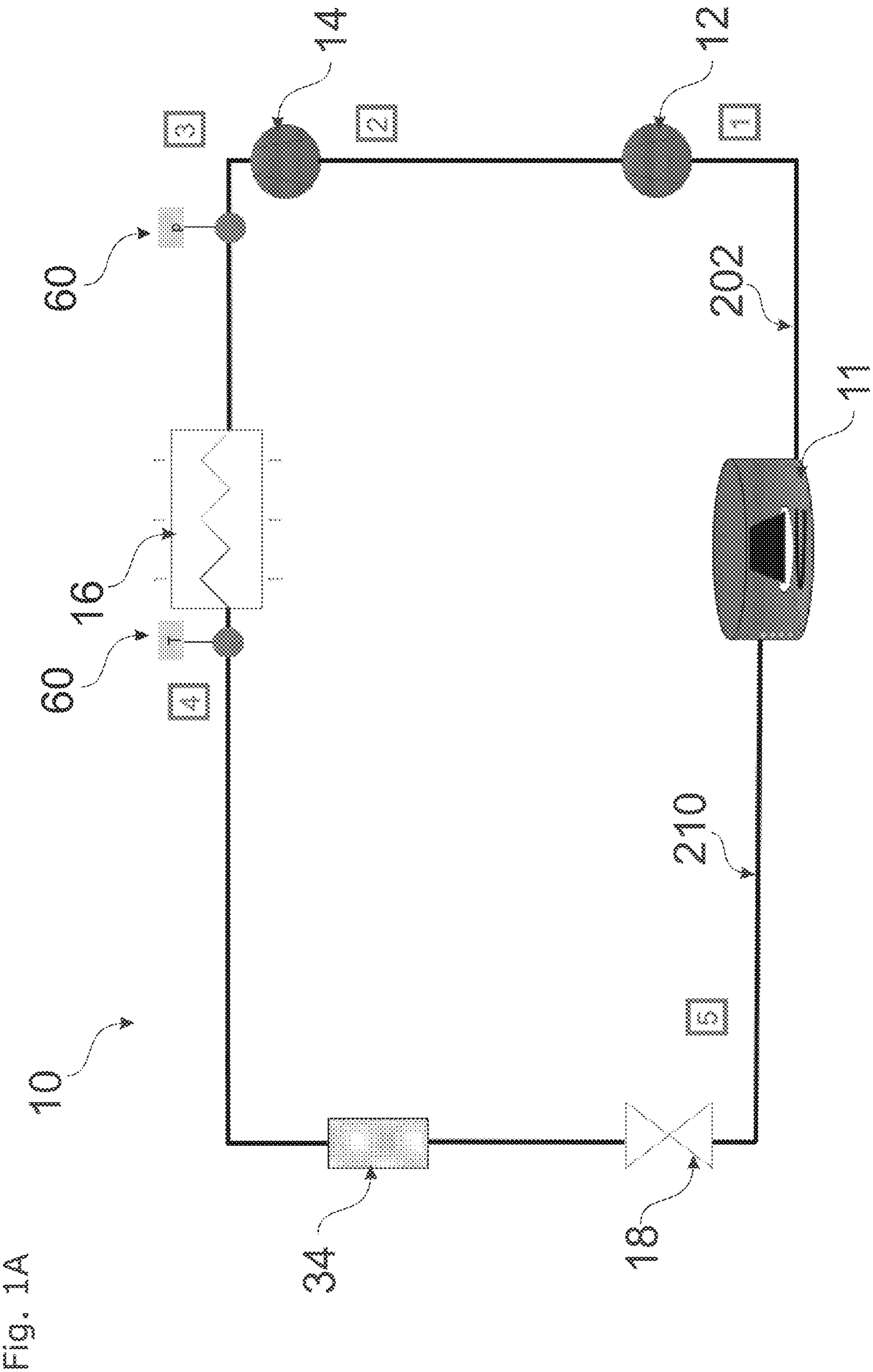
FIG. 1A is a schematic view of a cooling system according to an embodiment.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints. The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

According to a first aspect, the invention relates to a cooling system, wherein the cooling system comprises an evaporator, a first compressor, a second compressor, a cooling component, an expansion device, and a line system. The line system connects the evaporator, the first compressor, the second compressor, the cooling component, and the expansion device to one another. The cooling system includes a refrigerant, wherein the refrigerant comprises carbon dioxide. The first compressor and the second compressor are arranged in series with one another.

The cooling system can absorb heat at the evaporator and release heat at the cooling component. The cooling system can in particular comprise a closed refrigerant circuit, such that the refrigerant circulates in the cooling system without material-bound exchange with the surrounding atmosphere and/or a secondary refrigerant circuit. The cooling component can be a heat exchanger that is designed to thermally couple the refrigerant to the surrounding atmosphere in order to efficiently cool the refrigerant. The refrigerant can be gaseous in the cooling component. Furthermore, the cooling component can be a condenser that is designed to convert the refrigerant into a liquid state.

With the use of two compressors, the cooling system is of multi-stage design. As a result, the advantage can be achieved that particularly high pressures can be achieved, or a high pressure can be achieved as energy-efficiently as possible. The refrigerant can be sequentially compressed from a first pressure to a final pressure via at least one intermediate pressure. A further compressor can be provided for each intermediate compression. This allows the compression process to be distributed over a plurality of compressors.

The expansion device can be designed in particular as an expansion valve. The expansion valve can be designed to be controllable in order to implement controllable pressure regulation, in particular a pressure reduction. The refrigerant can expand through the expansion valve.

The cooling component can be arranged downstream of the compressor and/or the further compressor in the direction of flow of the refrigerant.

The refrigerant can be carbon dioxide (hereinafter also abbreviated as $CO_2$ or R744). R744 can have low toxicity. Therefore, $CO_2$ is an alternative to ammonia in particular. When R744 is used, the cooling system can go through a transcritical cycle: the critical point can be exceeded. As a result, a pressure and/or a temperature at the compressor can be increased.

With $CO_2$ as a refrigerant, a Global Warming Potential (GWP) can be reduced compared to conventional refrigerants. With a limitation to a GWP of below 150, possible refrigerants can be flammable (e.g. class A3 and A2L refrigerants) or $CO_2$, which is non-flammable, can be used. The use of $CO_2$ can result in an operating pressure of up to 140 bar. In particular, compared to the use of flammable refrigerants and/or fluorinated and/or halogenated fluorocarbons, an increased operating pressure, for example pressures greater than 60 bar, can occur.

The use of $CO_2$ as a refrigerant differs from various cooling systems from the prior art in which flammable refrigerants or hydrocarbons in which at least one hydrogen has been replaced by a halogen (e.g. what are referred to as fluorinated and halogenated fluorocarbons or F gases) are used as refrigerants for such cooling systems. Compared to flammable refrigerants, $CO_2$ has the advantage of increased operational reliability and, compared to other refrigerants, $CO_2$ has the advantage of being more environmentally friendly.

When using $CO_2$ as a refrigerant, a maximum achievable high pressure of single-stage compression by means of a single compressor can be limited. This disadvantage is overcome by the invention applying two-stage compression. On the other hand, the two-stage compression also allows the use of compressors of a relatively simple design.

With regard to the use of the cooling system in laboratory instruments, in particular in centrifuges, a permissible ambient temperature for the operation of the laboratory instrument can be up to 40° C. At this temperature, $CO_2$ can already be gaseous as a cooling medium in the cooling system. $CO_2$ can be cooled by means of heat exchange with the surrounding atmosphere. In this case, the $CO_2$ can remain gaseous. Therefore, a high pressure of at least 60 bar, preferably at least 70 bar, can be achieved in the cooling system. A corresponding compression can be achieved by means of two-stage compression.

Overall, embodiments of the invention therefore provide a new cooling system for the efficient use of $CO_2$ as a refrigerant.

The cooling system can be designed to perform a transcritical vapor compression cycle. In a transcritical cycle, the refrigerant can be above a critical point of the primary refrigerant, at least at times or in parts of the cycle. In particular, part of the cycle can occur at pressures above the critical point and another part of the cycle at pressures below the critical point. The critical point can mark the upper limit for heat transfer processes based on evaporation or condensation. At temperatures and pressures above this critical point, it is no longer possible to clearly distinguish between liquid and vapor. All refrigerants have a critical point, but for conventional refrigerants this point can always be fallen short of in a typical refrigeration cycle.

The refrigeration cycle can have a specific cycle performance characteristic that corresponds to a preferred operating state point at which the cooling system operates at optimal cycle efficiency. The present cooling system can achieve the advantage that, in the event of a deviation from this operating state point, readjustments can be made accordingly in order to achieve optimal system efficiency. In this case, the control comprises in particular the adjustment of the local refrigerant temperature through internal heat transfers or secondary refrigerant flows. An internal heat transfer can be defined as thermal conduction from a first cooling system portion to a second cooling system portion by means of thermal coupling of said cooling system portions. Secondary refrigerant flows can be realized by additional line portions that branch off refrigerant from a main circuit and feed it back to the main circuit at another point. This can realize a material-bound heat transfer.

By arranging the first and second compressors in series with one another, the refrigerant compressed to an intermediate pressure can be fed to the second compressor, which compresses the refrigerant from the intermediate pressure to the high pressure. Accordingly, the first compressor can be optimized for a first compression from a low pressure to the intermediate pressure and the second compressor can be optimized for compression from the intermediate pressure to the high pressure. Accordingly, each compression stage can be implemented with increased efficiency. Advantageously, the first compressor and/or the second compressor can be designed as fully hermetic compressors that prevent the refrigerant from flowing into the surrounding atmosphere.

Embodiments of the invention can use selective heat transfer within the cooling system to control a temperature of the cooling medium in the various cooling system regions to a respective optimal value. Furthermore, a compression stroke can be achieved both process- and cost-efficiently through two-stage compression. For example, a hot gas end temperature can be reduced. Furthermore, regulation of the refrigerant temperature can be achieved without using a fluidly separated secondary refrigerant cycle. For this purpose, for example, a mixture of refrigerants from different process points of the refrigerant cycle can be used. Advantageously, temperature regulation of the refrigerant by means of external apparatuses can thus be dispensed with.

The present invention can achieve improved system security because the crash safety of the laboratory instrument can be increased. In particular, through reduction to a single-circuit system, i.e., only one refrigeration circuit carrying refrigerant is provided, the use of other refrigerants, in particular flammable or toxic refrigerants (propane-R290, ammonia-R717) can be avoided. A non-flammable refrigerant can increase instrument safety: the rotor of a centrifuge can punch through a boiler wall and thus evaporator tubes carrying refrigerant. In comparison to flammable or toxic refrigerants, escaping $CO_2$ can in this case be classified as a low safety risk.

Due to high operating pressures, $CO_2$ can have both a high density during evaporation and a high volumetric cooling capacity during heat dissipation. As a result, the advantage of a reduced installation space can be realized in particular when the cooling system is integrated into a centrifuge. For example, an installation space volume of a cooling component or a condenser and/or an evaporator can be reduced.

Advantageously, the efficiency of the cooling system can be increased: the pressure ratio of low pressure to high pressure of the refrigerant can be limited. Furthermore, with the two-stage compression, the pressure ratio can be increased and the possible operating range can thus be expanded, in particular without external dissipation of heat on the basis of a secondary circuit. The operating range can be determined in relation to a specific ambient temperature range for the operation of the laboratory instrument. In addition, with regard to cooling systems having secondary circuits (use of cascade processes and/or heat pumps), the cooling system can have reduced instrument complexity and thus a lower susceptibility to errors and/or a reduced maintenance effort.

The cooling component can comprise a gas cooler and/or a condenser. The gas cooler can provide the refrigerant at an outlet of the cooling component in gaseous form and at a reduced temperature. The condenser can provide the refrigerant at the outlet of the cooling component in a liquid state and at a reduced temperature.

The cooling system can be designed to perform a transcritical vapor compression cycle. Accordingly, for example in the second compression stage, a pressure and a temperature that exceed a respective critical value can be achieved by means of the second compressor.

In addition, the cooling component can also be designed to convert the refrigerant from a gaseous phase into a liquid phase. Advantageously, the cooling component is also designed to withstand pressures and temperatures above the critical point.

The cooling system can be designed to perform a subcritical vapor compression cycle. Accordingly, a pressure and a temperature, in particular on the second compressor, can also be regulated in some operating states in such a way that the critical point of $CO_2$ is not reached or exceeded.

With a design for a subcritical region, reduced requirements with regard to permissible pressures and/or temperatures can be used in order to use components that meet the reduced requirements but would be unsuitable for transcritical operation, for example. A cost reduction can be achieved as a result.

The cooling system can have a cooling capacity of 10 W to 100 KW, preferably 500 W to 10 kW. Accordingly, the refrigeration cycle can be scaled in a range from small mobile devices and benchtop laboratory instruments to large industrial systems.

The cooling system can have a main circuit that has the evaporator, the first compressor, the second compressor, the cooling component, the expansion device and at least part of the line system. Furthermore, the refrigerant can be present in the main circuit. Most of the refrigerant flows through the main circuit. This can be defined as a flow of refrigerant that is greater than 50 wt. % (percent by weight) of the total refrigerant present in the cooling system. Secondary line portions can be provided that comprise a correspondingly smaller part of the refrigerant. In particular, the refrigerant for internal temperature regulation can be routed via secondary line portions.

The cooling component can be arranged downstream of the second compressor and upstream of the expansion device. Accordingly, the cooling component can reduce a temperature of the refrigerant before the refrigerant is supplied to the expansion device. The cooling component can be designed as a heat sink and extract heat from the refrigerant, which heat can be released to the surrounding atmosphere or to an external cooling system.

The cooling component can be configured to cool the refrigerant downstream of the second compressor. This allows the refrigerant to flow into the cooling component at a point in the cycle where the refrigerant temperature is at its maximum. The cooling component can lower the enthalpy by lowering the refrigerant temperature. This process can take place isobarically. Advantageously, cooling to a temperature below 30° C., preferably below 31° C., can be achieved.

The cooling system can be configured in such a way that, when the refrigerant leaves the first compressor at an outlet temperature, the refrigerant is fed to the second compressor at an inlet temperature that is lower than the outlet temperature. As a result, a maximum temperature of the refrigerant in the second compressor, or at the outlet of the second compressor, can be reduced, such that the thermal load on the second compressor can be reduced. With a temperature reduction between the compressors, the enthalpy can also be reduced isobarically in this case.

The inlet temperature and the outlet temperature can differ by a temperature difference that is greater than 1 K, preferably greater than 2 K, more preferably greater than 3 K. For example, the temperature difference can be in the range of from 3 K to 8 K. A heat sink can be provided between the compressors, which heat sink extracts heat from the refrigerant and transports it away from the cooling system. In this case, for example, a heat transfer to a central cooling system and/or a heat transfer to the surrounding atmosphere can be implemented.

The first compressor and/or the second compressor can be designed as scroll compressors, reciprocating compressors, screw compressors, rotary piston compressors, or a combination of the above. As a result, a compressor type optimized for the respective pressure range can be used. In particular, a compressor type that differs from the second compressor can be used as the first compressor.

The cooling system can have a return portion that is fluidly connected to the main circuit at a first connection point and at a second connection point. The second connection point can be located in the main circuit downstream of the first compressor and upstream of the second compressor. In particular, the efficiency of the cooling system can be increased via the return portion. A degree of delivery of the cooling system can be increased, such that a hot gas temperature at the outlet of the second compressor is reduced. The cooling capacity can scale with the degree of delivery of the cooling system. The degree of delivery can be a volumetric efficiency of the displacement of the compressors or the conveyed quantity of the compressors. High hot gas temperatures can affect, in particular reduce, the durability of a machine oil for lubricating the components. Therefore, the durability of the components can be extended with a temperature reduction.

Refrigerant can be injected into the refrigerant flow in the main circuit upstream of an inlet of the second compressor via the return portion. The injected refrigerant can have a reduced temperature, in particular a lower temperature than the refrigerant of the main circuit at the injection point, in this case in particular at the second connection point. A mixed flow having a reduced temperature can thus be provided by mixing the refrigerant at the injection point on the second compressor.

A thermal load in a centrifuge can be dynamic, i.e., an evaporation temperature can vary during operation. Depending on the operating mode of the centrifuge, varying thermal loads can occur. For example, different rotors can be used, and different setpoint speeds and/or setpoint temperatures can be set. With variable post-injection, the hot gas temperature at the compressor outlet or at the outlet of the second compressor can be regulated in order to take account of the variable loads on the evaporator.

The cooling system can be configured in such a way that the refrigerant in the return portion has a lower specific enthalpy at the second connection point than the refrigerant in the main circuit immediately upstream of the second connection point. In particular, the enthalpy in the return portion can be increased substantially isobarically and/or substantially isothermally. The vapor content can be changed by changing the enthalpy. In this case, the vapor content can be selected in such a way that the formation of droplets is prevented in order to protect the compressor. For example, vapor having a low liquid content can be introduced. In other words, the injection quantity can be selected such that the enthalpy inflow makes it possible to achieve an increased vapor content.

The cooling system can comprise a heat exchanger having a primary side that is arranged in the main circuit downstream of the cooling component. The heat exchanger can be designed to cool the refrigerant in the main circuit.

Additional cooling of the refrigerant can be implemented to improve the cooling performance when using $CO_2$ as the refrigerant. Advantageously, the heat exchanger is designed to extract heat from the refrigerant downstream of the cooling component, more preferably at an outlet of the cooling component.

The heat exchanger can be used to optimize the energy use of the cooling system. The cooling system can be used in instruments for analyzing medical samples, in particular in centrifuges, which can be operated at an ambient temperature of up to 40° C. Depending on the temperature, the optimum high pressure can also increase. The optimum high pressure can depend on the coefficient of performance. If the temperature and pressure values exceed a critical point of the refrigerant, the heat dissipation process can run transcritically as gas cooling. Transcritical gas cooling can take place isobarically. Liquefaction, on the other hand, can take place isobarically and largely isothermally. Due to the increased pressure of transcritical gas cooling, a drive power of the compressors can be increased.

The heat exchanger can be designed to provide the refrigerant at a predetermined temperature below an outlet temperature of the cooling component at the first connection point and/or in the line portion. The line portion can be delimited by the first connection point and an inlet of the expansion device. The heat exchanger can isobarically extract heat from the refrigerant in the main circuit. The refrigerant can pass through the heat exchanger in a transcritical, gaseous or liquid state.

The heat exchanger can be arranged upstream of the expansion device in the main circuit. As a result, the heat exchanger can contribute to the cooling of the refrigerant before it enters the expansion device.

The heat exchanger can comprise a secondary side that is arranged in the return portion. Furthermore, the heat exchanger can be designed to absorb heat from the refrigerant by means of the primary side and to emit the absorbed heat to the refrigerant by means of the secondary side in order to heat the refrigerant in the return portion. As a result of heating the refrigerant in the return portion, a refrigerant flow in the direction of the second connection point can nevertheless have a lower temperature than a refrigerant flow of the main circuit, in particular a lower temperature than a refrigerant flow from the first compressor to the second compressor in the main circuit. Even with a further heat exchanger arranged between the compressors and upstream of the second connection point, the temperature in the main circuit at the second connection point can always be higher than the temperature of a refrigerant flow from the return portion to the second connection point.

A refrigerant temperature between the outlet of the primary side of the heat exchanger and the inlet of the secondary side of the heat exchanger can be substantially identical. Heat losses can occur here through the line and/or other components, which can produce a small temperature difference. The secondary side can increase the enthalpy in the return portion isobarically and/or isothermally. In this case, the refrigerant can be in a wet vapor phase. In the return portion, the refrigerant can be converted from the wet vapor phase into a gaseous phase at the second connection point. This can be realized in particular by means of mixing at the connection point.

The secondary side can be arranged in the return portion upstream of the second connection point. Correspondingly, a partial refrigerant flow can flow from the first connection point to the second connection point through the secondary side. The heat transfer of the heat exchanger can substantially take place internally, i.e., here heat can be conducted from a flow in the main circuit to a flow in the return portion. The heat flow and material flow can be regulated separately from each other.

The first compressor can be designed to compress the refrigerant from a primary pressure range to a secondary pressure range, wherein the secondary pressure range has higher pressures relative to the primary pressure range. A distinction can be made between three pressure stages: a low pressure, which is present in particular upstream of the first compressor; an intermediate pressure, which is present in particular downstream of the first compressor and upstream of the second compressor; and a high pressure, which is present in particular downstream of the second compressor. The temperature of the refrigerant and in particular the enthalpy can change between the pressure stages. In particular, the first compressor can be used to set an intermediate pressure for further compression by the second compressor. In addition, a refrigerant temperature that is optimal for the second compressor or at least a sufficiently low one can be set between the first compressor and the second compressor. The refrigerant temperature between the compressors can be realized by mixing refrigerant via the return portion and/or by active cooling by means of a heat sink.

The second compressor can be designed to compress the refrigerant from the secondary pressure range to a tertiary pressure range, wherein the tertiary pressure range has higher pressures relative to the secondary pressure range. In this case, a pressure difference that the first compressor achieves can be smaller than a pressure difference that the second compressor achieves. In particular, the second compressor can be designed for a higher inlet pressure than the first compressor. Accordingly, suitable compressor outputs or suitable compressor types can be provided for the intended pressure ranges.

The cooling system can comprise a further expansion device that is arranged in the return portion and is designed to lower the refrigerant from the tertiary pressure range into the secondary pressure range. The pressure reduction can be implemented isenthalpically, such that both a pressure and a temperature of the refrigerant in the return portion can be reduced. With the temperature reduction, the refrigerant can be transferred from a gaseous and/or transcritical phase to a wet vapor phase.

The further expansion device can be arranged upstream of the secondary side of the heat exchanger and/or downstream of the first connection point. The secondary side can be coupled to the primary side in a thermally conductive manner. The further expansion device can be designed to control a refrigerant flow into the return portion. In particular, the further expansion device can be designed as a valve, wherein a volumetric flow through the expansion device is scaled with a degree of opening of the expansion device. A degree of opening of the expansion device can advantageously be controlled as a function of pressure and/or temperature. In particular, the expansion device can be used to control a refrigerant flow through the return portion as a function of a temperature at the outlet of the second compressor or a hot gas temperature. An inlet temperature at the inlet of the second compressor can scale with refrigerant flow through the return portion. The refrigerant in the return portion can have a lower temperature than the refrigerant between the compressors in the main circuit. Accordingly, a temperature at the inlet of the second compressor and thus also indirectly the temperature at the outlet of the second compressor can be regulated via the refrigerant flow through the return portion.

The cooling system can comprise a further heat exchanger that has a primary side that is arranged in the main circuit upstream of the expansion device and/or downstream of the cooling component. As a result, the advantage can be achieved that further heat can be extracted from the refrigerant upstream of the expansion device, but in particular also upstream of the evaporator, such that a cooling performance at the evaporator can be increased. Cooling can take place isobarically on the primary side, such that the enthalpy can be reduced. On the secondary side, the heating can also take place isobarically, such that the enthalpy can be increased. The refrigerant can flow through the additional heat exchanger in a liquid phase.

A coefficient of performance can be increased by using post-injection and the heat exchanger. Furthermore, the refrigerant can be further supercooled upstream of the expansion device by the additional heat exchanger. As a result, a greater specific evaporation capacity can be achieved, such that a mass flow of the refrigerant and the resulting compressor speeds of the first compressor and/or the second compressor can be reduced. An evaporation capacity can be adjusted, in particular increased, with post-injection via the return portion.

The further heat exchanger can be arranged downstream of the primary side of the heat exchanger in the main circuit. Accordingly, the refrigerant in the main circuit can be cooled by the heat exchanger and the further heat exchanger.

The further heat exchanger can comprise a secondary side that is arranged downstream of the evaporator and/or upstream of the first compressor in the main circuit. Furthermore, the further heat exchanger can be designed to absorb heat from the refrigerant by means of the primary side and to release the absorbed heat to the refrigerant by means of the secondary side in order to heat the refrigerant upstream of the first compressor. Accordingly, the further heat exchanger can implement a materially decoupled, internal heat transfer between different portions of the main circuit. Heating the refrigerant upstream of the inlet of the first compressor can increase the temperature of the refrigerant, as a result of which in particular a wet vapor phase of the refrigerant can be overcome and the refrigerant is present in the gaseous phase at the inlet of the first compressor. Downstream of the evaporator, the refrigerant can already be present at least in part in the gaseous phase. However, at least part of the refrigerant can still be in the liquid phase. For example, droplets of refrigerant can be suspended in a gaseous flow of refrigerant. Said refrigerant droplets can damage the compressor. With additional heating by the additional heat exchanger, the volumes of the refrigerant droplets can be reduced, or the droplets can be at least in part evaporated in the refrigerant flow. Advantageously, the first compressor can thus be protected against liquid impacts and/or the wear can be reduced by a reduced number and/or a reduced size of the refrigerant droplets.

Advantageously, it is possible for no additional energy to be necessary for the heat transfer between the primary side and the secondary side of the further heat exchanger. Accordingly, this heat transfer can increase the efficiency and/or durability of the cooling system. The further heat exchanger can cause a pressure loss, which can be overcome or compensated for by the compressor.

The further heat exchanger can be a line-to-line heat exchanger. As a result, the primary side is advantageously coupled to the secondary side in a heat-conducting manner but not in a material-transferring manner. For example, the primary side can be coupled to the secondary side via a thermally conductive material. In particular, an integral metal connection can be realized here.

The cooling system can comprise a liquid separator that is designed to separate the refrigerant in a liquid state. Furthermore, the liquid separator can be arranged in the main circuit downstream of the evaporator and/or upstream of the first compressor. In the evaporator, the refrigerant can be in a wet vapor phase, such that heat can be absorbed isobarically and isothermally by the refrigerant and enthalpy is increased. This heat absorption can be used to cool a laboratory instrument, in particular a rotor chamber of a centrifuge. At the outlet of the evaporator, the refrigerant can be present at a phase transition between the wet vapor phase and the liquid phase. In this case, the liquid collector can collect the still liquid parts of the refrigerant in order to provide the first compressor with a purely gaseous refrigerant flow.

The liquid separator can be arranged upstream of the secondary side of the additional heat exchanger. As a result, the secondary side of the further heat exchanger can form a type of refrigerant droplet filter that removes refrigerant droplets that pass through the liquid separator. A heating capacity of the further heat exchanger can be used with the liquid separator in order to provide a pure gas phase for the refrigerant. In particular, the further heat exchanger can be designed in such a way that a heating capacity is sufficient to remove refrigerant droplets. However, the heating capacity can be less than a capacity that can convert the entire refrigerant flow into the gas phase without a liquid separator. Accordingly, the refrigerant can be efficiently provided in a gaseous form to the first compressor through the combination of a liquid separator and a further heat exchanger. Furthermore, the enthalpy can be increased isobarically via the secondary side of the further heat exchanger, such that the refrigerant moves away from the phase transition between the wet vapor phase and the gas phase.

The cooling system can comprise a filter dryer that can be designed to remove water content from the refrigerant. Advantageously, the water content can be separated and/or filtered. The filter dryer can be arranged downstream of the cooling component and/or upstream of the expansion device in the main circuit. The filter dryer can advantageously be designed to bind moisture and/or acid present in the refrigerant. Advantageously, the filter dryer can filter dirt and/or other foreign bodies present in the refrigerant. The advantage can be achieved that acidification of a component oil can be suppressed and the compressors can thereby be protected.

The filter dryer can be arranged between the primary side of the heat exchanger and the primary side of the further heat exchanger in the main circuit. Advantageously, the refrigerant can pass through the filter dryer in a liquid phase. Filtering, in particular upstream of the expansion device, can prevent the formation of frozen water in the line system, such that the flow of the refrigerant is not impeded. Furthermore, the first compressor can also be protected from damage caused by ice particles.

The filter dryer can be arranged downstream or upstream of the first connection point. In this way, a partial flow of the refrigerant is fed into the return portion before filtering.

The cooling system can comprise an intermediate-pressure vessel that can be designed to divide the refrigerant into a liquid phase and a gas phase, wherein the intermediate-pressure vessel can be arranged downstream of the cooling component and/or upstream of the expansion device in the main circuit. The intermediate-pressure vessel can be a liquid separator in which a pressure, or an intermediate pressure, prevails within the secondary pressure range. The liquid separator separates the liquid phase and the gas phase of the refrigerant at the intermediate pressure. The liquid can be used as a template for the expansion device, such that a refrigerant flow flows from the liquid separator to the expansion device in the liquid phase. The gas phase of the refrigerant can be fed to the second compressor via the return portion. The second compressor can advantageously be designed to (i.e., be configured to) suck the refrigerant in the gas phase from the intermediate-pressure vessel. This returned refrigerant gas can be mixed with refrigerant gas from the first compressor. In one embodiment, the returned refrigerant gas in the primary pressure range can be mixed with the refrigerant in the main circuit. Whether the refrigerant is mixed in the secondary pressure range or in the primary pressure range can be determined by a type of the first compressor.

The intermediate-pressure vessel can be designed as a three-way accumulator and comprise the following components:

a vessel inlet that is designed to conduct refrigerant into the intermediate-pressure vessel and is arranged downstream of the cooling component;

a first vessel outlet that is designed to conduct liquid refrigerant from the intermediate-pressure vessel into the line portion 208 and arranged upstream of the evaporator and/or upstream of the expansion device; and a second vessel outlet that couples the intermediate-pressure vessel to the return portion and is designed to conduct gaseous refrigerant into the return portion.

The vessel inlet can be arranged in the main circuit downstream of the heat exchanger and/or downstream of the filter dryer. Accordingly, already filtered and/or cooled refrigerant can be provided to the intermediate-pressure vessel.

The first connection point can be formed by the intermediate-pressure vessel. Refrigerant in the gas phase can be coupled into the return portion via the second vessel outlet. With the phase separation, the refrigerant in the gas phase can be introduced into the return portion and the refrigerant in the liquid phase can correspondingly be fed to the expansion valve. The refrigerant in the gas phase can have an increased enthalpy compared to the refrigerant in the liquid phase. The first heat exchanger can bring about additional heat input into the refrigerant in order to bring the refrigerant further into the gas phase from a phase transition from wet vapor to gaseous to a higher temperature. In this way, in particular, the liquid fraction of the refrigerant can be reduced upstream of the second compressor before being injected into the main circuit.

The intermediate-pressure vessel can be designed to provide the refrigerant at the first vessel outlet, advantageously in the liquid phase, at least at a phase transition from the liquid phase to the wet vapor phase. The enthalpy can be reduced to such an extent via the intermediate-pressure vessel that the refrigerant changes from the wet vapor phase to the liquid phase. This enthalpy reduction can be realized isothermally.

The cooling system can comprise a high-pressure control apparatus that can be designed to reduce the pressure of the refrigerant, in particular to reduce the pressure from the tertiary pressure range into the secondary pressure range or to reduce the pressure within the tertiary pressure range. In particular, the temperature of the refrigerant can change when there is a flow through the high-pressure control apparatus. The pressure control can be performed isenthalpically. In this case, the refrigerant can be converted from the liquid phase to the wet vapor phase. Downstream of the high-pressure control apparatus, the cooling system can have an enthalpy minimum, pressure minimum, and/or temperature minimum. Accordingly, heat absorption at the evaporator can be maximized.

The high-pressure control apparatus can be arranged upstream of the intermediate-pressure vessel, and/or downstream of the cooling component, downstream of the first heat exchanger, and/or downstream of the filter dryer in the main circuit. In particular, the high-pressure control apparatus can be arranged at the vessel inlet of the intermediate-pressure vessel in order to reduce an inlet pressure of the intermediate-pressure vessel. The high-pressure control apparatus is advantageously designed to bring about a phase transition of the refrigerant from the liquid phase or a transcritical phase into the wet vapor phase. The pressure change can be realized isenthalpically.

The high-pressure control apparatus can be regulatable based on a pressure, in particular based on a pressure of the refrigerant downstream of the cooling component. Alternatively, the pressure reduction can also be controlled by means of the high-pressure control apparatus on the basis of a temperature, in particular a temperature at an outlet of the first heat exchanger. A pressure at the outlet of the first heat exchanger can advantageously be used to control the high-pressure control apparatus.

The high-pressure control apparatus can be regulatable based on a pressure downstream of the first heat exchanger, based on a pressure upstream of the high-pressure control apparatus, and/or based on a pressure upstream of the filter dryer. Advantageously, the high-pressure control apparatus can be controlled based on a maximum pressure of the refrigerant.

The expansion device can be a superheating control apparatus and designed to control superheating of the refrigerant at the evaporator. This can achieve the advantage that a low-pressure liquid separator can be omitted. A liquid separator in the primary pressure range can therefore be dispensed with. In addition, there is no need to heat the refrigerant upstream of the first compressor. Accordingly, the second heat exchanger can be omitted with a high-pressure control apparatus and an intermediate-pressure vessel. Advantageously, the superheating control apparatus can be designed to control an injection temperature at the evaporator in such a way that it corresponds to the saturation temperature.

The expansion device can be designed to control a pressure of the refrigerant, in particular to reduce a pressure of the refrigerant from the secondary pressure range to the primary pressure range or to reduce it from the tertiary pressure range to the primary pressure range. With a reduction from the secondary pressure range into the primary pressure range, a pressure reduction from the tertiary pressure range into the secondary pressure range can be implemented upstream by means of the high-pressure control apparatus. This can be a single-stage expansion, wherein two-stage compression is realized by means of the first compressor and the second compressor.

The expansion device can be regulatable based on a pressure, in particular based on a pressure of the refrigerant downstream of the evaporator and/or upstream of the first compressor. At an outlet of the evaporator, the cooling system can have a maximum enthalpy and the refrigerant can have a minimum pressure. Accordingly, the expansion device can be controlled as a function of a pressure to be reached and/or a temperature to be reached at the outlet of the evaporator. Accordingly, the heat absorption at the evaporator can be increased. Advantageously, an inlet pressure and an inlet temperature can be set with the expansion device in such a way that the refrigerant can absorb the greatest possible amount of heat when flowing through the evaporator, or the greatest possible increase in enthalpy can be realized, such that the cooling performance at the evaporator is as high as possible. The evaporator can heat the refrigerant as far as the phase transition from the wet vapor phase to the gas phase or beyond the phase transition.

The expansion device can be regulatable based on a pressure upstream of the further heat exchanger. For example, a pressure between the evaporator or the expansion element and the first compressor can be detected in order to control an opening of the expansion device. In this way, the expansion device can be regulated independently of a heat input upstream of the first compressor, in particular independently of a heat input of the secondary side of the further heat exchanger.

The expansion device can be regulatable on the basis of a parameter value of the intermediate-pressure vessel in order to control a flow of the refrigerant from the line portion into the line portion. The intermediate-pressure vessel can be a passive element, wherein a refrigerant flow through the respective vessel outlets can be controlled by a pressure difference downstream in the direction of the expansion device and/or by a further pressure difference in the return portion.

The parameter can be a fill level, a pressure, a temperature and/or an aggregate state of the refrigerant in the intermediate-pressure vessel. The fill level can correspond to a volume of the refrigerant in the liquid phase in the intermediate-pressure vessel. Furthermore, a ratio of liquid phase and gas phase in the intermediate-pressure vessel can be regulated by an outflow of refrigerant into the return portion and an outflow downstream to the expansion device. Advantageously, a ratio of liquid phase and gas phase of the refrigerant in the intermediate-pressure vessel can be kept substantially constant.

The expansion device can be designed to detect the parameter value on the intermediate-pressure vessel. The expansion device can thus set superheating of the refrigerant at the outlet of the evaporator. For example, the superheating can range from 3 K to 10 K. A pressure and/or a temperature on the intermediate-pressure vessel, in the intermediate-pressure vessel or in the line system in the immediate vicinity of the intermediate-pressure vessel can preferably be detected. The combination of pressure and temperature can indicate the proportion of gaseous refrigerant; it is preferably possible to detect when only gaseous refrigerant is present. In this case, the pressure, in particular the pressure in the intermediate-pressure vessel, can be regulated in order to obtain at least part of the refrigerant in liquid form in the intermediate-pressure vessel. The pressure can be regulated, for example, with a downstream valve, in particular by means of the expansion device. A liquid fraction of the refrigerant in the intermediate-pressure vessel can be achieved by lowering the pressure (out of the transcritical region). If the refrigerant is in a transcritical state, the refrigerant can be converted into a liquid state or into the wet vapor phase by reducing the pressure. If the combination of pressure and temperature indicates only transcritical refrigerant in the vessel, the pressure can be reduced (opening the downstream valve, closing the upstream valve) in order to achieve liquid or wet vapor in the vessel again, which is beneficial to the performance of the evaporator. If the state of the gas in the container is subcritical, an increase in pressure can increase the liquid content in the container. The cooling performance at the evaporator can be increased by means of appropriate regulation. The regulation can be implemented by comparing the outlet temperature of the evaporator, the measured pressure and the resulting saturation temperature with the pressure difference between the expansion device and the compressor inlet of the first compressor. In this case, a liquid separator between the evaporator and the compressor can be omitted.

The cooling system can comprise a second cooling component that is designed to cool the refrigerant and arranged downstream of the first compressor and/or upstream of the second compressor. The second cooling component can form an intercooler. Enthalpy can be removed isobarically from the refrigerant with the second cooling component. At an outlet of the first compressor, the cooling system can have a maximum enthalpy. The intercooler and/or the injection of cooled refrigerant from the return portion can reduce the enthalpy. Advantageously, the enthalpy at the inlet of the second compressor can be at a local minimum in the gas phase. Correspondingly, an enthalpy at an inlet of the first compressor can be higher than the enthalpy at the inlet of the second compressor. Even after compression by the second compressor, both the pressure and the temperature of the refrigerant can be higher than after compression by the first compressor. However, the enthalpy after the second compression can be lower than after the first compression.

The second cooling component can be designed to extract heat from the refrigerant and to release it to a central cooling system and/or the surrounding atmosphere. Alternatively, the heat can be dissipated by means of a secondary cooling circuit.

A compression of the second compressor can be dependent on an inlet temperature of the refrigerant at the inlet of the second compressor. Advantageously, by cooling the refrigerant, an optimum high pressure of the refrigerant or a high pressure generated by the second compressor can be reduced. Cooling the refrigerant can prevent a critical operating temperature of the second compressor from being exceeded.

The second cooling component can be arranged upstream of the connection point. As a result, the refrigerant can first be cooled by the second cooling component, and then further cooling can be realized by mixing with the refrigerant flow from the return portion. This realizes a two-stage temperature reduction between the first compressor and the second compressor.

The second cooling component can be designed to cool the refrigerant when the refrigerant exceeds an ambient temperature in order to provide the refrigerant at an outlet of the second cooling component in a gaseous form, within the secondary pressure range and at a reduced temperature. In particular, a temperature reduction by means of the second cooling component can be controlled in such a way that a transition into the wet vapor phase is prevented. In particular, the control also takes place in such a way that the combination cooling based on the second cooling component and the refrigerant supply via the return portion realizes a temperature of the refrigerant at the inlet of the second compressor above the wet vapor phase transition.

The second cooling component can be designed to cool the refrigerant to a predetermined temperature, such that the refrigerant has a temperature below a limit temperature downstream of the second compressor. Here, taking into account heating of the refrigerant by the second compressor, a limit value can be defined for an inlet temperature of the refrigerant at the second compressor, such that the second compression falls below a maximum temperature of the refrigerant. The limit temperature can be determined in such a way that the refrigerant has a subcritical temperature. The subcritical temperature can be set at the inlet or at the outlet of the second compressor.

The second cooling component can comprise a fan that is designed to generate an air flow on the second cooling component in order to extract heat from the refrigerant. This allows heat to be dissipated to the surrounding atmosphere.

The second vessel outlet can be connected to the second cooling component via a line portion. In this case, a branch to the second compressor can be provided at the line connection, such that mixed refrigerant flows from the second cooling component and from the intermediate-pressure vessel to the second compressor. Here, in addition, a refrigerant flow from the return portion can be added.

A first refrigerant flow can flow from the second cooling component to a further connection point and a second refrigerant flow can flow from the second vessel outlet to the further connection point. Furthermore, the first refrigerant flow and the second refrigerant flow can be mixed into a combined refrigerant flow at the further connection point and the mixed refrigerant flow can flow via the line portion to the second connection point and/or to the second compressor. This can realize three-stage temperature regulation of the refrigerant between the first compressor and the second compressor. A first cooling can be achieved by means of the second cooling component, a second cooling can be achieved by means of an inflow of refrigerant from the intermediate-pressure vessel, and a third cooling can be realized by means of an inflow of refrigerant via the return portion. This can be a maximum configuration of internal cooling, wherein the cooling stages can be designed redundantly.

In particular, a valve for pressure regulation can be provided both upstream and downstream of the intermediate-pressure vessel. Accordingly, the valves and the intermediate-pressure vessel can be used to realize a redundant expansion from the tertiary pressure range to the primary pressure range via the secondary pressure range. Both the expansion device and the high-pressure control apparatus can achieve superheating control. Redundant high-pressure control can be provided here by the intermediate-pressure vessel and the high-pressure control apparatus to prevent liquid impacts.

In the secondary pressure range, refrigerant can be injected from the return portion into the line 204 via the second connection point. A refrigerant flow through the return portion can be regulated by means of the intermediate-pressure vessel or the further expansion device.

The heat exchanger can be designed to provide the refrigerant at the second connection point with a first specific enthalpy, and the second cooling component can be designed to provide the refrigerant at the second connection point with a second specific enthalpy, wherein the first specific enthalpy is smaller than that second specific enthalpy. This can ensure that the injection via the return portion allows further cooling and no heating of the refrigerant to take place upstream of the second compressor.

A refrigerant flow in the return portion and a further refrigerant flow in the line can be mixed into a combined refrigerant flow at the second connection point. The mixed refrigerant flow can be provided at the second compressor. At the second connection point, a temperature between the temperature of the refrigerant in the return portion and the temperature of the refrigerant upstream of the second connection point in the main circuit can be adjusted by mixing the refrigerant flows depending on the volume fractions of the refrigerant flows. Advantageously, at least a two-stage temperature reduction can be achieved.

The second cooling component can be designed to cool the refrigerant on the basis of an ambient temperature and/or on the basis of a limit temperature of the evaporator. An ambient temperature is advantageously lower than the temperature of the refrigerant in the second cooling component in order to prevent heat absorption from the surrounding atmosphere at the second cooling component. The higher an outlet temperature of the evaporator, the higher an ambient temperature can be at which heat can be emitted to the surrounding atmosphere at the second cooling component. Cooling, or enthalpy removal, by means of the second cooling component can be controlled in such a way that the formation of a liquid phase in the refrigerant flow to the second compressor is prevented.

In this case, a hot gas temperature, for example a temperature of the refrigerant downstream of the first compressor, can scale with an evaporation inlet temperature. Because the enthalpy absorption in the evaporator can take place isothermally, the evaporator outlet temperature can correspond to the evaporator inlet temperature. With an evaporation temperature of −20° C. and higher, the further cooling component between the compressors can advantageously extract heat from the refrigerant. In a range from −40° C. to −20° C., a temperature at the outlet of the first compressor can be equal to or lower than the ambient temperature. For example, the temperature at the outlet of the first compressor can be below 30° C. A displacement of the first compressor and a pressure in the primary pressure range can be selected such that the temperature at the outlet of the first compressor is always above the ambient temperature. A permissible maximum ambient temperature can be defined in this case: for example, permissible operation of the cooling system at an ambient temperature of up to 30° C., of up to 35° C. or of up to 40° C. can be defined.

The cooling system can comprise a circuit control that is designed to control a flow of the refrigerant. In particular, heat absorption in the evaporator, heat emission at the cooling component and/or at an ambient temperature can change an equilibrium state of the cooling system, such that the circuit control can regulate the refrigerant flow accordingly in order to set optimal temperature and pressure values.

The circuit control can be designed to control an opening of the expansion device on the basis of a pressure of the refrigerant, in particular a high pressure downstream of the cooling component and/or downstream of the second compressor. As a function of a degree of opening of the expansion device, expansion of the refrigerant downstream of the expansion device can be controllable. For this purpose, a pressure and/or temperature sensor can be provided at an outlet of the cooling component and/or a pressure and/or temperature sensor can be provided at the outlet of the second compressor.

The circuit control can be designed to control an opening of the expansion device on the basis of a pressure of the refrigerant downstream of the heat exchanger. For this purpose, a pressure and/or temperature sensor can be arranged at an outlet of the heat exchanger. Advantageously, the temperature can be detected upstream of the filter dryer. A controlled variable can be a pressure in the tertiary pressure range of the cooling system. The controlled system can comprise the line system and the components of the cooling system downstream of the first compressor and/or the second compressor and upstream of the expansion device.

The expansion device can have a valve and can be designed to gradually or continuously adapt an opening of the valve in a range from completely closed to completely open on the basis of control actuation by the circuit control. A volume flow of the refrigerant through the expansion device to the evaporator can be regulated by opening the expansion device.

The circuit control can be designed to control an opening of the expansion device on the basis of a temperature of the refrigerant upstream of the first compressor and/or downstream of the evaporator, in particular a temperature at an evaporator outlet.

As a function of a degree of opening of the expansion device, expansion of the refrigerant downstream of the expansion device can be controllable. In this case, in particular, a pressure reduction can be controlled, which can also isenthalpically bring about a temperature change.

The circuit control can be designed to determine a predetermined temperature value and to control an opening of the expansion device when the predetermined temperature value is exceeded by a detected temperature, in particular an evaporator outlet temperature. The predetermined temperature value can be an empirical and/or calculated media temperature.

The circuit control can be designed to control an opening of the additional expansion device as a function of a temperature of the refrigerant downstream of the first compressor and/or downstream of the second compressor, in particular a compressor outlet temperature or hot gas temperature, wherein as a function of the degree of opening of the further expansion device expansion of the refrigerant downstream of the further expansion device is controllable. In this case, the compressor outlet temperature or the hot gas temperature can be defined as the controlled variable, and the first compressor and/or the second compressor can be defined as the controlled system. In this way, a pressure and/or a temperature of the refrigerant at the outlet of the second compressor can be detected. A refrigerant flow through the return portion can thus be adjusted in order to set an optimal hot gas temperature. A heat transfer of the heat exchanger from the main circuit into the return portion can be controlled as a function of a degree of opening of the further expansion device. The further expansion device can advantageously set a pressure in the secondary pressure range in the return device. Depending on the degree of opening of the further expansion device, a predetermined pressure value can be set.

The circuit control can be designed to control an opening of the high-pressure control apparatus as a function of a pressure of the refrigerant downstream of the second compressor and/or upstream of the high-pressure control apparatus. A pressure sensor can be provided at an outlet of the heat exchanger, at an outlet of the cooling component and/or at an outlet of the second compressor.

The circuit control can be designed to control the high-pressure control apparatus as a function of a pressure downstream of the heat exchanger and/or upstream of the filter dryer. A detected pressure in the tertiary pressure range can be defined as the controlled variable and a portion of the cooling system in the tertiary pressure range can be defined as the controlled system. For example, this is a refrigerant route from the outlet of the second compressor to the inlet of the high-pressure control apparatus or up to the intermediate-pressure vessel, or up to the expansion device.

The cooling system can have a compressor drive apparatus that is designed to drive the first compressor and/or the second compressor. As a result, the advantage can be achieved that both the first compressor and the second compressor can be driven and controlled via a common drive apparatus. In this case, each of the compressors can be driven separately, i.e., they can be supplied with different drive powers. The first compressor and the second compressor can be arranged in a common housing. Furthermore, the compressor drive apparatus can be a motor that can be designed to drive the first compressor and drive the second compressor.

The compressor drive apparatus can be designed to control a respective compressor speed of the first compressor and/or the second compressor as a function of a pressure of the refrigerant, in particular an evaporation pressure, and/or a temperature of the refrigerant, in particular an evaporation temperature, downstream of the expansion device, wherein as a function of a compressor speed, a compression capacity of the first compressor and/or the second compressor is controllable. As a result, the advantage can be realized that a predetermined evaporation temperature, i.e., a temperature during the isothermal enthalpy absorption in the evaporator, can be set via the compressor speed. In this case, the evaporation pressure or the evaporation temperature can be defined as a controlled variable and the compressor output or speed can be defined as a controlled system.

The first compressor, the second compressor and/or the compressor drive apparatus can each have a drive and be designed to gradually or continuously adapt a speed of the respective drive on the basis of control actuation by the circuit control in a predetermined range from a minimum speed to a maximum speed. As a result, particularly efficient actuation of the compressors can be implemented.

The circuit control can be designed to control the compressor speed on the basis of a predetermined evaporation temperature. For example, in order to lower the evaporation temperature, the compressor speed of the first compressor and/or the second compressor can be increased. In order to increase the evaporation temperature, the compressor speed of the first compressor and/or the second compressor can be reduced. The circuit control can be designed to increase and/or decrease the compressor speed The cooling component can comprise a fan that is designed to direct an air flow through the cooling component for cooling. As a result, the cooling component can be thermally coupled to the surrounding atmosphere.

The cooling component can comprise a refrigerant-brine heat exchanger that is designed to transfer heat from the refrigerant to a brine.

The circuit control can be designed to control a fan speed of the fan as a function of a temperature of the refrigerant downstream of the cooling component, in particular a cooling component outlet temperature, wherein a cooling performance of the cooling component is controllable as a function of a fan speed. An air flow to the cooling component can scale with the fan speed. Advantageously, a cooling performance of the cooling component can also be scaled at least partially with the fan speed.

The fan can be designed to gradually or continuously adapt the fan speed on the basis of control actuation by the circuit control in a predetermined range from a minimum speed to a maximum speed.

The circuit control can be designed to control the fan as a function of a thermal load in a plurality of stages, wherein the fan speed is zero in a first control stage, the fan rotates at a first speed greater than zero in a second control stage and/or rotates at a second speed in a third control stage, wherein the second speed is greater than the first speed.

The circuit control can be designed to control the pressure in the tertiary pressure range in such a way that cooling performance is maximized. In particular, an optimal high pressure can be set. The optimal high pressure can depend on the ambient temperature and, correspondingly, on a cooling performance of the cooling component. Optimal high pressure can vary depending on subcritical or transcritical operation. For example, the optimal high pressure can be about 100 bar for a transcritical cycle and about 50 to 60 bar for a subcritical cycle.

The circuit control can be designed to control superheating at the evaporator by means of the expansion device in such a way that the superheating is minimal, wherein the superheating is preferably at least 3 K at a compressor inlet of the first compressor. In this way, the advantage can be achieved that the first compressor can be protected against liquid impacts caused by refrigerant in the liquid phase. At the evaporator, the process can substantially take place isothermally and isobarically up to the structural end of an evaporator tube of the evaporator. Superheating of the refrigerant can be realized at the constructive end of the evaporator. With minimized superheating at the outlet of the evaporator, cooling performance can be maximized, wherein the temperature at the inlet of the evaporator is advantageously equal to the saturation temperature.

The circuit control can be designed to control a respective compressor outlet temperature at the first compressor and/or at the second compressor by means of the further expansion device in such a way that said compressor outlet temperature falls below a predetermined limit temperature.

At the second connection point, cooled refrigerant from the return portion can be injected to lower a compressor outlet temperature.

The circuit control can be designed to continuously control a first compressor speed of the first compressor and a second compressor speed of the second compressor. Furthermore, the circuit control can be designed to control the first compressor speed and the second compressor speed independently of one another. As a result, optimal compression of the refrigerant can be achieved by the respective compressor and, in particular, an optimal high pressure can be set. Vibrations can be reduced thanks to the independent, continuous control of the compressors. Advantageously, when the cooling system is used in a centrifuge, transmission of vibrations to samples can be reduced, such that the centrifugation quality can be increased. Furthermore, improved user perception can be achieved through reduced noise emission or vibration of the centrifuge. A soft start can be implemented with the speed control, i.e., the first compressor and/or the second compressor can be driven with reduced acceleration for a predetermined time range, for example 60 s to 120 s, after a starting process. An improved centrifugation quality, an improved centrifugate and improved user perception can thus be achieved. Advantageously, the first compressor and the second compressor can be formed by two compression chambers in a compressor module. The first compressor and/or the second compressor can each have a predetermined starting speed, such that the compressors only start when a predetermined frequency and/or voltage threshold is exceeded. This means that the compressor starts up with a low threshold or excitation speed.

The circuit control can be designed to accelerate the first compressor and/or the second compressor to a respective predetermined setpoint speed with a respective predetermined acceleration value in a starting phase. Preferably, an acceleration can be less than or equal to 8 revolutions/$s^2$. In this case, the predetermined setpoint speed can form a threshold value for distinguishing between a reduced acceleration and an increased acceleration. A reduction in vibrations in the laboratory instrument can advantageously be achieved with a reduced acceleration. According to a further advantageous embodiment, the circuit control can be designed to accelerate the first compressor and/or the second compressor with an acceleration greater than 8 revolutions/$s^2$ in a second acceleration phase after a first acceleration phase with a reduced acceleration, in particular with an acceleration less than or equal to 8 revolutions/$s^2$. As a result, the advantage can be achieved that an oil flow, in particular an oil flow of the compressor oil, can also be accelerated.

In embodiments of the invention, it can also be provided that the cooling system is designed to operate the first compressor and/or the second compressor at a first rotational speed and at a second rotational speed that is greater than the first rotational speed, but the cooling system is further designed such that rotational speeds between the first and the second rotational speed are not assumed (i.e., only instantaneously during a speed change). In other words, operating speeds can be avoided. In this way, in particular, resonance excitations at such speeds can be avoided.

The circuit control can be designed to control a speed of the fan as a function of an acceleration of the first compressor and/or an acceleration of the second compressor, in particular to control it continuously. Depending on the compressor acceleration rate, the fan speed can be regulated in such a way that, as the speed of the first compressor and/or the second compressor increases, the fan speed can increase. A thermal load on the cooling component can be directly proportional to the compressor speed of the first compressor and/or the second compressor.

A control characteristic curve of the fan can lead ahead of a control characteristic curve of the first compressor and/or the second compressor. The fan can be started with a gently rising characteristic curve. The first compressor and/or the second compressor can also be started with a comparable gently rising characteristic curve. The characteristic curve of the fan can lead ahead of the characteristic curve of the compressors in order to generate a power reserve, i.e., before the compressors are accelerated, the fan can first be accelerated and then the compressors can catch up. As a result, the advantage can be achieved that load-adapted control of the fan reduces the primary energy to be used. Furthermore, the noise emissions from the cooling system or the laboratory instrument can also be reduced.

The circuit control can be designed to control a fan speed of the fan as a function of an ambient temperature, in particular proportional to the ambient temperature, wherein the ambient temperature can be detected on the laboratory instrument, preferably at an air outlet of the cooling component. With a reduced ambient temperature, for example below 22° C., the fan on the cooling component can run at reduced fan speed. If the ambient temperature is increased, for example to above 24° C., the fan speed can be increased compared to operation at a standard temperature, for example 23° C. A temperature window can be defined around the ideal ambient temperature. At a predetermined ambient temperature, for example 23° C., the temperature window can be 2 K, for example: 1 K up and 1 K down. The fan can run at an advantageous optimal speed within the temperature window. Depending on the fluctuation in the ambient temperature, the circuit control can be used to continuously regulate the speed up or down from this optimal speed. In this way, the performance of the cooling component can be increased in order to take into account an increased ambient temperature. The increased ambient temperature can lead to a lower temperature difference between the cooling medium, for example an ambient air flow, and the refrigerant, and thus to lower performance. This loss of performance can be compensated for by increasing the fan speed.

The circuit control can be designed to control the expansion device as a function of an outlet temperature of the cooling component and/or an ambient temperature in order to set a pressure in the tertiary pressure range, in particular an optimal high pressure. With high-pressure control adapted to the ambient temperature, a cooling performance can be increased on an instrument-specific basis, in particular on a centrifuge-specific basis, for special environmental but also application conditions.

The expansion device can comprise a thermostatic valve or an electronic expansion valve. An electronic expansion valve can be controlled by the circuit control. A thermostatic valve can be operated independently as a function of a temperature value.

The circuit control can be designed to detect a change in the ambient temperature and to control the expansion device, the compressor speeds and/or a fan speed on the basis of the ambient temperature change. By controlling the fan and linking it to the compressors, it is possible to react to changes in the ambient temperature. An increased ambient temperature, and thus a higher optimal high pressure, can be counteracted by closing the expansion device, increasing the speed of the compressors, or reducing the speed of the fan. These measures allow the high pressure or the pressure at the outlet of the second compressor to be increased and thus optimal performance to be achieved.

According to a second aspect, the invention relates to a laboratory instrument having a cooling system. For example, the cooling system can be designed as described. In particular, the laboratory instrument can be a centrifuge, an incubator, and/or a biological safety cabinet. The cooling system can advantageously cool a component of the laboratory instrument, for example a cooling chamber, a sample chamber and/or a centrifuge rotor. In this case, temperature control can also be implemented, such that the component can be regulated to a predetermined temperature.

The laboratory instrument can also be a mixing tank, a stirred vessel, a reactor, and/or general temperature-controlled laboratory equipment, such as a refrigerator or freezer, in particular for biological or chemical samples. For this purpose, the cooling system can be integrated into the respective laboratory instrument or connected to the cooling system via a line system for heat exchange.

The laboratory instrument can be a table-top instrument or a stand-alone instrument. The cooling system can advantageously be integrated into a housing of the laboratory instrument. In particular, the cooling system can be designed to provide cooling performance independently of external cooling circuits in the laboratory instrument.

The laboratory instrument can comprise a rotor tank on which the evaporator is arranged. The evaporator can be thermally coupled to the rotor tank to extract heat from the rotor tank. In this way, cooling of the rotor tank and in particular of biological samples arranged in the rotor tank can be realized.

The evaporator can comprise an evaporator coil that is arranged on an outer side of the rotor tank, wherein the evaporator coil is formed by a circumferential line. The evaporator coil can run in a spiral around the rotor tank. In particular, a contact surface of the evaporator coil on the rotor tank can be maximized in order to achieve thermal coupling between the evaporator coil and the rotor tank.

The evaporator coil can have a shape that is flattened on at least one side (e.g., a D-shape) in order to form a flat side, wherein the flat side bears against the outer surface of the rotor tank in order to form a surface contact. As a result, a heat flow from the rotor tank to the evaporator coil can advantageously be increased.

The evaporator coil can have an outer tube diameter in a range from 5 mm to 20 mm, preferably 10 mm or 16 mm. Furthermore, the evaporator coil can have a wall thickness of 0.5 mm to 5 mm, preferably a wall thickness of 1 mm. By reducing an outer tube diameter, surface contact of the evaporator coil with the rotor tank can advantageously be increased. When a decreasing outer tube diameter is used, the number of turns of the evaporator coil on the outer surface of the rotor tank can be increased. As a result, with the rotor tank surface remaining the same, greater coverage of the rotor tank surface can be achieved by the evaporator coil. Gaps between the turns of the evaporator coil can be reduced. Advantageously, a smaller temperature difference between samples in the rotor tank and an evaporation temperature can be achieved as a result. The possibility of using smaller outer tube diameters, in particular using 10 mm or 12 mm tubes instead of 16 mm tubes, can be linked to the use of $CO_2$ as a refrigerant. With the reduction in tube cross section, a pressure drop across the evaporator can be increased. Advantageously, the heat transfer area can be maximized and the pressure drop minimized.

An increase in the contact surface between the evaporator coil and the rotor tank can result in a change in the temperature difference between the inside of the tube and the inside of the tank. A temperature on the inside of a tank can approach the evaporation temperature due to the increase in surface area. As a result, a lower control temperature, in particular a lower tank temperature, and thus better sample cooling, can be achieved. Further, the reduction in tube diameter can realize a cost advantage.

The rotor tank can have a side jacket surface, a bottom jacket surface and a bottom surface, wherein the side jacket surface is cylindrical and the bottom jacket surface has a curved profile and is designed to connect the side jacket surface to the bottom surface. Advantageously, the line of the evaporator coil is pressed into a D-shape on the side jacket surface.

The evaporator coil can be arranged on the side jacket surface, the bottom jacket surface and/or the bottom surface. As a result, the contact surface between the evaporator coil and the rotor tank can advantageously be increased in order to maximize heat transfer from the rotor tank to the evaporator.

The evaporator coil can form a surface contact on the side jacket surface. The surface contact can be a continuous surface, wherein respective contact surfaces of the individual coils of the evaporator coil are arranged next to one another in such a way that the coils abut each other in a form-fitting manner and no free space is formed. The free space can have a substantially triangular shape. A surface area of the free space can scale with the outer tube diameter of the evaporator coil and correspondingly be proportionally smaller with a reduced outer tube diameter.

The laboratory instrument can comprise a user interface that is designed to transmit a setpoint temperature and/or a rotor speed of a rotor arranged in the rotor tank to the circuit control on the basis of a user input. In this case, the setpoint temperature can be a preset value for a control temperature, in particular a tank temperature. The control temperature can be chosen according to the design of the laboratory instrument.

Based on the rotor speed, a rotor speed change, the setpoint temperature, a difference between a current control temperature and the setpoint temperature and/or the ambient temperature, the circuit control can control the respective compressor speed of the first compressor and/or the second compressor, the fan speed of the fan on the cooling component and/or a degree of opening of the expansion device.

The circuit control can be designed to compare a setpoint temperature input with a detected temperature of the rotor tank and to determine a temperature difference. Furthermore, the circuit control can be designed to adapt the compressor speed, the fan speed and/or the degree of opening of the expansion device if the temperature difference exceeds a difference threshold value. The difference threshold can be in the range of from 1 K to 10 K, preferably the difference threshold is 5 K. Preferably, the compressor speed, the fan speed and/or the degree of opening of the expansion device can each be reduced or increased by 20%. The percentage change can relate to a respective maximum value, i.e., a compressor end speed, a fan end speed and a maximum opening angle.

The circuit control can also be designed to detect whether an actuation triggered by the setpoint temperature input, in particular a corresponding opening, of the expansion device reduces or eliminates superheating upstream of the first compressor; the actuation can be prevented on the basis of the setpoint temperature input. Correspondingly, the circuit control can be designed to detect superheating and to stop the actuation if the superheating is less than 1 K. Alternatively, the circuit control can be designed to control the expansion device or the corresponding valve in such a way that the corresponding valve closes completely. As a result, the optimum high pressure can advantageously be set.

The circuit control can be designed in particular to carry out the change in the degree of opening of the expansion device with a time delay, advantageously with an offset of 30 s in relation to the change in the compressor speed.

The circuit control can also be designed to detect a temperature difference between a cooling component outlet temperature at an outlet of the cooling component and the ambient temperature and, if a temperature difference of +3 K is reached, to prevent an adaptation of the fan speed, which adaptation is based on a changed setpoint temperature input. Advantageously, the circuit control is designed to change the fan speed starting from a temperature difference of +5 K. If the 20% change in fan speed does not result in an improvement in a temperature difference range of <5 K, the fan speed can be adapted again. Only then does the change take place at the next control stage. In this case, the circuit control can be designed to adapt the compressor speed as a first control stage, adapt the fan speed as a second control stage and adapt the degree of opening of the expansion device as a third control stage. In this case, the circuit control can be designed to carry out the control stages in the order of the first control stage, the second control stage and then the third control stage.

If the control temperature deviates by >3 K, a further control cycle having a respective 20% stage can be carried out by means of the circuit control at the end of the control cycle having a respective 10% stage. The 10% stage can also relate to a respective maximum value, i.e., a final compressor speed, a final fan speed and a maximum opening angle. As a result, the advantage can be achieved that the control temperature can be gradually approached to the setpoint temperature. A final control cycle can be performed with a control stage in the range of 1% to 5%, preferably 2%.

Various advantages can be achieved by means of the described embodiments.

For example, the area of application of a corresponding system (and of a centrifuge that has such a system) can be expanded. Such an expansion can result from the special two-stage design in conjunction with R744 (i.e., $CO_2$). For example, it can be possible to expand the area of application to an ambient temperature of up to 40° C. For example, with a single-stage, fully hermetic system in conjunction with R744 and with evaporation pressures in the range of from 10 bar to 30 bar, maximum operating pressures of 75 bar can be achieved, which corresponds to approximately 35° C.

The upper application limit for a hermetic, single-stage compressor is the transcritical region. In general, single-stage compressors can only be used permanently in the subcritical region due to the limited pressure difference. Embodiments of the present technology overcome this by using the refrigerant $CO_2$ in conjunction with two compressors connected in series, such that there is no subcritical region limitation and the system can also be operated in the transcritical region. In particular, with a single compressor, it is possible for the achievable pressure difference from the lower stage to the upper stage to be too low in relation to evaporation pressures in a range of from 10 bar to 30 bar. The high pressure can depend on the ambient temperature. Advantageously, with the use of at least two compressors, a low pressure can be achieved even at elevated ambient temperatures, in particular at ambient temperatures above 30° C.

The use of two compressors that are connected in series can be advantageous over the use of a single compressor, in particular when $CO_2$ is used as the refrigerant, for the following reasons.

The following technical parameters are relevant for compressors:

- geometric volume flow, determined by the product of the base area of the compression cylinder and the height of the compression cylinder and the number of revolutions per second of the compressor drive;
- actual measured volume flow;
- degree of delivery, which can depend on the pressure ratio (inlet pressure to outlet pressure), the clearance volume and/or leaks.

The degree of delivery can also be determined by a volume flow-related quality level. The volume flow-related quality level describes the back expansion into the design-related clearance volume or dead space (e.g. distance between pistons, cylinder covers). The actual volume flow is reduced by means of back expansion into the clearance volume. The higher the high pressure, the more refrigerant with higher enthalpy expands back into the clearance volume or dead space (when the piston starts to move down and the suction cycle starts). This refrigerant expands as the piston moves down. The refrigerant sucked in from the low-pressure side and the back-expanded refrigerant mix. Thus, the enthalpy is increased at the start of compression and the compressor outlet temperature rises. The latter is shown by a parallel shift of the compression line towards higher enthalpies in a log (p)-h diagram.

Furthermore, the degree of delivery can also be determined by a degree of wall quality. The degree of wall quality describes the extent to which gas flowing in from the low-pressure side is heated before compression by means of secondary effects, such as heating on a cylinder wall, steam friction, etc. This warming is preferably kept low because it reduces the density and thus the actual volume flow.

In addition, the degree of delivery can also be determined by the degree of laxity. Losses in laxity increase with increasing compression end pressure and decrease with increasing compressor speed because less time is then available for vapor exchange.

The volume flow-related quality level and the wall quality level correlate negatively with the pressure ratio; the degree of laxity correlates with the compression end pressure.

Increasing pressure ratios in single-stage compression decrease the degree of delivery to the point where the compression end temperature rises very sharply and the enthalpy increase during polytropic compression far exceeds that of isentropic compression. The compression then takes place with a significant increase in entropy, which illustrates irreversible losses during compression. This reduces the cooling capacity and increases wear. Using two compressors in series can achieve the following advantages over a single compressor: for both compressor stages, the pressure ratio is reduced as a correlative driver of the losses and cooling can be induced in the intermediate pressure stage, which improves the degree of delivery and reduces the losses during compression.

The increase in entropy during compression can also be described using the polytropic ratio=dh/dy. Depending on the specific head, the polytropic ratio can be defined as follows $$\frac{\kappa}{(\kappa-1)}\times\left(\left(\ln\frac{T_2}{T_1}\right)\Big/\left(\ln\frac{P_2}{p_1}\right)\right)$$

1 indicates a value upstream of the compressor and 2 indicates a value downstream of the compressor. Accordingly, an increase in enthalpy per compression can decrease with a smaller pressure ratio. The increase in entropy during a single compression is higher than during a double compression due to the above-mentioned mechanical and refrigeration phenomena, as well as the material behavior as a result of the lower preliminary temperatures and pressures.

In addition, the intake states in low pressure and intermediate pressure can be so different that division into two compressors is advantageous: the volume at the outlet of the compressor is very high, i.e., a large displacement is required here. Due to the reduced pressure difference, the drive power can be lower than it would have to be in the case of single-stage compression. The same considerations apply to the second stage, only in this case the volume is smaller and the drive power is larger.

In addition, through embodiments of the technology, it is possible to achieve optimal cooling capacity by setting an optimal high pressure. The optimal high pressure in the refrigeration circuit (high pressure value for optimal cooling capacity), which is largely dependent on the ambient temperature (or the temperature at the gas cooler outlet), can only be achieved by two-stage compression at higher ambient temperatures. Depending on a predetermined low pressure and the resulting pressure ratio to the optimum high pressure, a single-stage compressor may never or only temporarily reach the optimal high pressure economically and with great efficiency. This means that in order to achieve maximum cooling capacity using a centrifuge and its operating conditions (sometimes up to 40° C.), a two-stage refrigeration circuit is advantageous. The maximum displacement between low and high pressure of current single-stage compressors is usually 40 to 60 bar in a fully hermetic configuration (wherein the transcritical region is only temporarily used), wherein the use of fully hermetic compressors is advantageous because a semi-hermetic compressor can be critical in the interior space where centrifuges are predominantly operated (damaging physiological effects of $CO_2$ on the human organism).

As already described, embodiments of the technology are in particular directed to the cooling system being used in a centrifuge. Such use can also be advantageous in terms of thermal load. A centrifuge differs from other applications in terms of thermal load and therefore benefits from two-stage compression. The thermal load in a centrifuge is dynamic (unlike other compression-expansion refrigeration circuit applications), while applications in a refrigerator or freezer can be considered more static. In the case of a refrigerator or freezer, the operator can leave the door open at the maximum and close the refrigerator with a delay. The evaporation temperature is always within a relatively narrow range. If the door is left open, the required cooling capacity can fluctuate briefly. In a centrifuge, on the other hand, the thermal loads can be permanently variable due to the different rotors used (type, speed, setpoint temperature setting by the operator, imbalance, loading). In particular, the use of variable post-injection to regulate the hot gas temperature at the compressor outlet is therefore advantageously necessary in order to take into account variable loads on the evaporator.

In embodiments of the technology described, a soft start or a separate start can already be provided. In the embodiments in which the system is part of a centrifuge, the centrifugation quality can be increased in this way. In other words, an R744 compressor offers advantages in terms of start-up behavior. Thanks to the continuous control of both compressors independently of one another, vibrations that can affect the samples and the centrifugation quality or user perception can be reduced. A soft start, i.e., operating the two-stage compressor with low acceleration for 60-120 seconds after the start process, has a positive effect on the centrifugation quality, the centrifugate and user perception (in particular with two compression chambers in one compressor). In general, there can be a fixed starting speed for the compressor that only allows the compressor to start when a certain frequency or voltage threshold is exceeded. This means that the compressor starts up gently (low threshold or excitation speed) and then starts up at a low speed. The acceleration of the speed should ideally be small (e.g. 8/s per 10 seconds or less, i.e., an acceleration of 8 revolutions/s per second is the threshold acceleration rate for distinguishing between gentle and fast acceleration of the compressor). A lower acceleration rate results in less vibration in the device.

In addition, embodiments of the technology allow operator comfort to be increased by means of continuous fan control based on a compressor acceleration rate. Depending on the compressor acceleration rate, the fan speed can be controlled (a higher compressor speed means a higher load on the gas cooler or condenser). This means that the fan can be designed as a continuously variable fan. This fan can be started with the gently rising characteristic curve described above (like the compressor curve). The characteristic curve of the fan can lead ahead of that of the compressor in order to have a power reserve (i.e., before the compressor is accelerated, the fan is first accelerated and then the compressor follows). The advantage of this type of control is the load-adapted use of the fan, which results in a lower use of primary energy. The control can further achieve the advantage of reducing overshoots of the high-to-intermediate pressure ratio. By reducing the power of the fan, noise emissions from the fan can advantageously be reduced.

Embodiments of the technology described also allow the refrigeration circuit operating conditions to be set as a function of the ambient temperature (depending on the variable thermal load of the rotor and the installation conditions). In other words, in the case of the R744 circuit, a fan speed can be related to the measured ambient temperature (around the device) at the gas cooler outlet. It should be understood that the cooling device can in particular comprise a fan, and the fan speed designates the speed of this fan. If the ambient temperature is lower (e.g. below 22° C.), then the fan on the gas cooler can run more slowly. If the ambient temperature is higher (e.g. higher than 24° C.), the fan can rotate faster than at 23° C. This means that the window around the ideal ambient temperature of 23° C. can be, for example, 2 Kelvin, 1 Kelvin up and 1 Kelvin down respectively, in which ideal ambient temperature the fan runs at an ideal speed. Depending on the fluctuation in the ambient temperature, it is possible to deviate continuously up or down from this speed. In this way, the performance of the gas cooler is gradually increased to take account of the increased ambient temperature. The increased ambient temperature leads to a lower temperature difference between the cooling medium and refrigerant and thus to lower performance. The increased fan speed in the case of a deviation of 23° C. can compensate for this.

Furthermore, depending on the ambient temperature (around the instrument), the optimal high pressure for the cooling capacity at the evaporator can be set by means of an electronic or thermostatic expansion valve located in the return portion. This can increase the capacity for special environmental and application conditions in a load- and thus centrifuge-specific manner. This means that the ambient temperature of a centrifuge also depends on the waste heat (rotor-specific) and the installation location. It is thus possible to react to any changes in the ambient temperature by controlling the fans and linking them to the compressors or to the compressor. An increased ambient temperature (and thus a higher optimal high pressure) can be counteracted by closing the valve, increasing the speed of the compressor, or reducing the speed of the fan. These measures allow the high pressure to be increased and thus optimal performance to be achieved.

In embodiments of the present technology, the system can be operated with a control system that is adapted to the two-stage $CO_2$ refrigeration installation. In this case, it should be understood that the two-stage $CO_2$ refrigeration installation refers to the cooling system in which $CO_2$ is used as the refrigerant and in which the two compressors are arranged in series. In particular, the control system can be used in a centrifuge that has the appropriate cooling system. Relatively precise temperature control can be achieved in this way.

For example, if the operator changes a speed or a setpoint temperature on a control panel during operation, the current tank temperature deviation, the ambient temperature and the extent of the speed change by the operator influence

- the speed(s) of the compressor(s),
- the speed of the fan or gas cooler or
- the degree of opening of the valve responsible for recirculation.

In particular, such a system can be operated with the following control system:

If the new setpoint temperature deviates by >5 Kelvin above or below the currently measured temperature (in the order described below),

- the speed of the compressor is reduced or increased by a value (e.g. 20% of the final speed),
- the fan speed is reduced or increased by a value (e.g. 20% of the final speed),
- the degree of opening of the valve is increased or decreased by a value (e.g. 20% of the maximum opening angle).

With an increase in temperature (i.e., an increase in the setpoint temperature), the valve can be opened, and with a decrease in temperature (i.e., a decrease in the setpoint temperature), the valve can be closed. Superheating can be reduced by opening the valve. Accordingly, a mass flow and thus a cooling performance can be increased.

If the opening of the valve would lead to the superheating disappearing before the first compression stage, this control process is not carried out for the valve (e.g. if the superheating is already <1 Kelvin). The degree of opening of the valve can be changed with an offset of, for example, 30 seconds in order to change the compressor speed.

If the temperature at the outlet of the gas cooler is +3 Kelvin away from the ambient temperature, the speed is not changed. The fan speed is only changed starting from a deviation of 5 Kelvin in the gas cooler outlet temperature. If the 20% change does not result in an improvement in the deviation range of <5 Kelvin, the fan speed is changed again. Only then does the change take place at the next change stage.

If the deviation of the control temperature deviation is >3 Kelvin (after the upper control cycle has expired), the process is repeated from above, with adjustments in 10% increments (from the maximum degrees of opening or speeds of the components).

In this way, the setpoint temperature can be gradually approached. The last iteration loop can be lowered by 5%. If correspondingly fast controllers and components are used, this threshold can optionally be set to 2%. In this regard, a trade-off can be made between switching frequency and control quality because frequent switching can cause greater wear on components.

Overall, it is also understandable that the two-stage compression according to the invention can possibly lead to relatively high hot gas end temperatures, or a high temperature at the outlet of the second compression stage. Therefore, in embodiments of the invention, means are provided that reduce this temperature, for example the return portion or the second cooling component.

System embodiments are named below. These embodiments are abbreviated with the letter "S" followed by a number. Whenever reference is made below to "system embodiments," these embodiments are intended. Any feature of any system embodiment can be combined with any feature of any other system embodiment.

S1. A cooling system (10), the cooling system (10) having:

- an evaporator (11),
- a first compressor (12),
- a second compressor (14),
- a cooling component (16),
- an expansion device (18) and
- a line system (20', 21') that connects the evaporator (11), the first compressor (12), the second compressor (14), the cooling component (14) and the expansion device (18) to one another,
- wherein the cooling system (10) includes a refrigerant, wherein the refrigerant comprises carbon dioxide,
- wherein the first compressor (12) and the second compressor (14) are arranged in series with one another.

S2. The cooling system (10) according to the preceding embodiment, wherein the cooling component (16) comprises a gas cooler and/or a condenser.

S3. The cooling system (10) according to any of the preceding embodiments, wherein the cooling system is designed to perform a transcritical vapor compression cycle.

S4. The cooling system (10) according to any of the preceding embodiments, wherein the cooling system is designed to perform a subcritical vapor compression cycle.

S5. The cooling system according to any of the preceding embodiments, wherein the cooling system has a cooling capacity of 10 W to 100 KW, preferably 500 W to 10 kW.

S6. The cooling system (10) according to any of the preceding embodiments, wherein the cooling system has a main circuit, wherein the main circuit has:

the evaporator (11), the first compressor (12), the second compressor (14), the cooling component (16), the expansion device (18) and at least part of the line system (20', 21'); and wherein the refrigerant is present in the main circuit.

S7. The cooling system (10) according to any of the preceding embodiments, wherein the cooling component (16) is arranged downstream of the second compressor (14) and upstream of the expansion device (18).

S8. The cooling system (10) according to any of the preceding embodiments, wherein the cooling component (16) is configured to cool the refrigerant downstream of the second compressor (14).

S9. The cooling system (10) according to any of the preceding embodiments, wherein the cooling system (10) is configured in such a way that, when the refrigerant leaves the first compressor at an outlet temperature, the refrigerant is fed to the second compressor at an inlet temperature that is lower than the outlet temperature.

S10. The cooling system (10) according to the preceding embodiment, wherein the inlet temperature and the outlet temperature differ by a temperature difference that is greater than 1 K, preferably greater than 2 K, more preferably greater than 3 K.

S11. The cooling system (10) according to the preceding embodiment, wherein the first compressor (12) and/or the second compressor is designed as one of the following types of compressors:

scroll compressor;

reciprocating compressor;

screw compressor;

rotary piston compressor.

S12. The cooling system (10) according to any of the preceding embodiments having the features of embodiment S6, wherein the cooling system (10) has a return portion (40) that is fluidically connected to the main circuit at a first connection point (42) and at a second connection point (44), wherein the second connection point (44) is located in the main circuit downstream of the first compressor (12) and upstream of the second compressor (14).

S13. The cooling system (10) according to any of the preceding embodiments having the features of embodiments S9 and S12, wherein the cooling system (10) is configured in such a way that the refrigerant in the return portion (40) has a lower specific enthalpy at the second connection point (44) than the refrigerant in the main circuit immediately upstream of the second connection point (44).

S14. The cooling system (10) according to any of the preceding embodiments having the features of embodiment S12, comprising a heat exchanger (48), wherein the heat exchanger (48) comprises a primary side that is arranged in the main circuit downstream of the cooling component (16), and wherein the heat exchanger (48) is designed to cool the refrigerant in the main circuit.

S15. The cooling system (10) according to any of the preceding embodiments having the features of embodiment S14, wherein the heat exchanger (48) is designed to provide the refrigerant at a predetermined temperature below an outlet temperature of the cooling component (16) at the first connection point (42) and/or in the line portion (208).

S16. The cooling system (10) according to any of the preceding embodiments having the features of embodiment S15, wherein the heat exchanger (48) is arranged upstream of the expansion device (18) in the main circuit.

S17. The cooling system (10) according to any of the preceding embodiments having the features of embodiment S15, wherein the heat exchanger (48) comprises a secondary side that is arranged in the return portion (40), and wherein the heat exchanger (48) is designed to absorb heat from the refrigerant by means of the primary side and to emit the absorbed heat to the refrigerant by means of the secondary side in order to heat the refrigerant in the return portion (40).

S18. The cooling system (10) according to any of the preceding embodiments having the features of the embodiments S12 and S17, wherein the secondary side is arranged in the return portion (40) upstream of the second connection point (44).

S19. The cooling system (10) according to any of the preceding embodiments, wherein the first compressor (12) is designed to compress the refrigerant from a primary pressure range to a secondary pressure range, wherein the secondary pressure range has higher pressures with respect to the primary pressure range.

S20. The cooling system (10) according to any of the preceding embodiments having the features of embodiment S19, wherein the second compressor (14) is designed to compress the refrigerant from the secondary pressure range to a tertiary pressure range, wherein the tertiary pressure range has higher pressures with respect to the secondary pressure range.

S21. The cooling system (10) according to the preceding embodiment and having the features of embodiment S12, comprising a further expansion device (46) that is arranged in the return portion, wherein the further expansion device (46) is designed to lower the refrigerant from the tertiary pressure area into the secondary pressure range.

S22. The cooling system (10) according to any of the preceding embodiments having the features of embodiments S12 and S21, wherein the further expansion device (46) is arranged upstream of the secondary side of the heat exchanger (48) and/or downstream of the first connection point (42).

S23. The cooling system (10) according to any of the preceding embodiments having the features of embodiment S6, comprising a further heat exchanger (50), wherein the further heat exchanger (48) comprises a primary side that is arranged in the main circuit upstream of the expansion device (18) and/or downstream of the cooling component (16), and wherein the further heat exchanger (50) is designed to cool the refrigerant.

S24. The cooling system (10) according to any of the preceding embodiments having the features of embodiment S14 and S23, wherein the further heat exchanger is arranged downstream of the primary side of the heat exchanger (48) in the main circuit.

S25. The cooling system (10) according to any of the preceding embodiments having the features of embodiment S23, wherein the further heat exchanger (50) comprises a secondary side that is arranged downstream of the evaporator (11) and/or upstream of the first compressor (12) in the main circuit, and wherein the further heat exchanger (50) is designed to absorb heat from the refrigerant by means of the primary side and to release the absorbed heat to the refrigerant by means of the secondary side in order to heat the refrigerant upstream of the first compressor (12).

S26. The cooling system (10) according to any of the preceding embodiments having the features of embodiment S23, wherein the further heat exchanger (50) is a line-to-line heat exchanger.

S27. The cooling system (10) according to any of the preceding embodiments, comprising a liquid separator (30) that is designed to separate the refrigerant in a liquid state, and wherein the liquid separator (30) is arranged in the main circuit downstream of the evaporator (11) and/or upstream of the first compressor (12).

S28. The cooling system (10) according to any of the preceding embodiments having the features of embodiment S25, wherein the liquid separator (30) is arranged upstream of the secondary side of the further heat exchanger (50).

S29. The cooling system (10) according to any of the preceding embodiments, comprising a filter dryer (34) that is designed to remove water from the refrigerant, and wherein the filter dryer (34) is arranged downstream of the cooling component (16) and/or upstream of the expansion device (18) in the main circuit.

S30. The cooling system (10) according to any of the preceding embodiments having the features of the embodiments S14, S23 and S29, wherein the filter dryer (34) is arranged between the primary side of the heat exchanger (48) and the primary side of the further heat exchanger (50) in the main circuit.

S31. The cooling system (10) according to any of the preceding embodiments having the features of embodiments S12 and S29, wherein the filter dryer (34) is arranged downstream of the connection point (42).

S32. The cooling system (10) according to any of the preceding embodiments, comprising an intermediate-pressure vessel (70) that is designed to divide the refrigerant into a liquid phase and a gas phase, wherein the intermediate-pressure vessel (70) is arranged in the main circuit downstream of the cooling component (16) and/or upstream of the expansion device (18).

S33. The cooling system (10) according to any of the preceding embodiments having the features of embodiments S23 and S32, wherein the intermediate-pressure vessel (70) is designed as a three-way accumulator and has:

- a vessel inlet (71) that is designed to conduct refrigerant into the intermediate-pressure vessel (70) and arranged downstream of the cooling component (16);
- a first vessel outlet (72) that is designed to feed liquid refrigerant from the intermediate-pressure vessel into the line portion (208) and arranged upstream of the evaporator (11) and/or upstream of the expansion device (18);
- a second vessel outlet (73) that couples the intermediate-pressure vessel (70) to the return portion (40) and is designed to conduct gaseous refrigerant into the return portion (40).

S34. The cooling system (10) according to any of the preceding embodiments having the features of the embodiments S6, S14 and S33, wherein the vessel inlet (71) is arranged in the main circuit downstream of the heat exchanger (48).

S35. The cooling system (10) according to any of the preceding embodiments having the features of embodiments S29 and S33, wherein the vessel inlet (71) is arranged downstream of the filter dryer (34).

S36. The cooling system (10) according to any of the preceding embodiments having the features of the embodiments S12 and S32, wherein the first connection point (42) is formed by the intermediate-pressure vessel (70).

S37. The cooling system (10) according to any of the preceding embodiments, comprising a high-pressure control apparatus (74) that is designed to reduce the pressure of the refrigerant, in particular to reduce the pressure from the tertiary pressure range to the secondary pressure range or to reduce the pressure within the tertiary pressure range.

S38. The cooling system (10) according to the preceding embodiments and having the features of embodiment S32, wherein the high-pressure control apparatus (74) is arranged upstream of the intermediate-pressure vessel (70).

S39. The cooling system (10) according to any of the 2 preceding embodiments and having the features of embodiments S14 and S29, wherein the high-pressure control apparatus (74) is arranged in the main circuit downstream of the cooling component (16), the first heat exchanger (48) and/or the filter dryer (34).

S40. The cooling system (10) according to any of the preceding embodiments having the features of the embodiments S37, wherein the high-pressure control apparatus (74) can be controlled on the basis of a pressure, in particular on the basis of a pressure of the refrigerant downstream of the cooling component (16).

S41. The cooling system (10) according to any of the preceding embodiments having the features of embodiments S12 and S37, wherein the high-pressure control apparatus (74) can be controlled based on a pressure downstream of the first heat exchanger (48) and/or upstream of the high-pressure control apparatus (74).

S42. The cooling system (10) according to any of the preceding embodiments having the features of the embodiments S29 and S37, wherein the high-pressure control apparatus (74) can be controlled based on a pressure upstream of the filter dryer (34).

S43. The cooling system (10) according to any of the preceding embodiments, wherein the expansion device (18) is a superheating control apparatus and is designed to control superheating of the refrigerant at the evaporator (11).

S44. The cooling system (10) according to any of the preceding embodiments having the features of embodiment S43, wherein the expansion device (18) is designed to control a pressure of the refrigerant, in particular to reduce a pressure of the refrigerant from the secondary pressure range to the primary pressure range or from the tertiary pressure range to the primary pressure range.

S45. The cooling system (10) according to any of the preceding embodiments, wherein the expansion device (18) can be controlled based on a pressure, in particular based on a pressure of the refrigerant downstream of the evaporator (11) and/or upstream of the first compressor (12).

S46. The cooling system (10) according to any of the preceding embodiments having the features of embodiment S23, wherein the expansion device (18) can be regulated on the basis of a pressure upstream of the further heat exchanger (50).

S47. The cooling system (10) according to any of the preceding embodiments having the features of embodiment S32, wherein the expansion device (18) can be controlled on the basis of a parameter value of the intermediate-pressure vessel (70) in order to control a flow of the refrigerant from the line portion (208) to the line portion (210).

S48. The cooling system (10) according to any of the preceding embodiments having the features of embodiment S47, wherein the parameter is a fill level, a pressure, a temperature and/or a state of aggregation of the refrigerant in the intermediate-pressure vessel.

S49. The cooling system (10) according to any of the preceding embodiments having the features of embodiment S47, wherein the expansion device (18) is designed to detect the parameter value on the intermediate-pressure vessel (70).

S50. The cooling system (10) according to any of the preceding embodiments, comprising a second cooling component (32) that is designed to cool the refrigerant and is arranged downstream of the first compressor (12) and/or upstream of the second compressor (14).

S51. The cooling system (10) according to any of the preceding embodiments having the features of the embodiments S12 and S50, wherein the second cooling component (32) is arranged upstream of the connection point (44).

S52. The cooling system (10) according to any of the preceding embodiments having the features of embodiment S50, wherein the second cooling component (32) is designed to cool the refrigerant when the refrigerant exceeds an ambient temperature in order to provide the refrigerant at an outlet of the second cooling component (32) in gaseous form, within the secondary pressure range and at a reduced temperature.

S53. The cooling system (10) according to any of the preceding embodiments having the features of the embodiments S50, wherein the second cooling component (32) is designed to cool the refrigerant to a predetermined temperature, such that the refrigerant has a temperature below a limit temperature downstream of the second compressor (14).

S54. The cooling system (10) according to any of the preceding embodiments having the features of the embodiments S53, wherein the limit temperature is determined in such a way that the refrigerant has a subcritical temperature.

S55. The cooling system (10) according to any of the preceding embodiments having the features of the embodiments S50, wherein the second cooling component (32) comprises a fan that is designed to generate an air flow on the second cooling component (32) in order to extract heat from the refrigerant.

S56. The cooling system (10) according to any of the preceding embodiments having the features of embodiments S32 and S50, wherein the second vessel outlet (73) is connected to the second cooling component (32) via a line portion (216).

S57. The cooling system (10) according to any of the preceding embodiments having the features of the embodiment S56, wherein a first refrigerant flow flows from the second cooling component (32) to a further connection point (52) and a second refrigerant flow flows from the second vessel outlet (73) to the further connection point (52), and wherein the first refrigerant flow and the second refrigerant flow are mixed to form a combined refrigerant flow at the further connection point (52), and wherein the mixed refrigerant flow flows via the line portion (214) to the second connection point (44) and/or to the second compressor (14).

S58. The cooling system (10) according to any of the preceding embodiments having the features of the embodiment S12, wherein refrigerant from the return portion (40) can be injected into the line (204) via the second connection point (44) in the secondary pressure range.

S59. The cooling system (10) according to any of the preceding embodiments having the features of the embodiments S14 and S50, wherein the heat exchanger (48) is designed to provide the refrigerant at the second connection point (44) with a first specific enthalpy, and wherein the second cooling component (32) is designed to provide the refrigerant at the second connection point (44) with a second specific enthalpy, wherein the first specific enthalpy is smaller than the second specific enthalpy.

S60. The cooling system (10) according to any of the preceding embodiments having the features of embodiment S12, wherein a refrigerant flow in the return portion (40) and a further refrigerant flow in the line (214) are mixed at the second connection point (44) to form a combined refrigerant flow, and wherein the mixed refrigerant flow is provided at the second compressor (14).

S61. The cooling system (10) according to any of the preceding embodiments having the features of embodiment S50, wherein the second cooling component (32) is designed to cool the refrigerant on the basis of an ambient temperature and/or on the basis of a limit temperature of the evaporator (11).

S62. The cooling system (10) according to any of the preceding embodiments, comprising a circuit control that is designed to control a flow of the refrigerant.

S63. The cooling system (10) according to any of the preceding embodiments having the features of embodiment S62, wherein the circuit control is designed to control an opening of the expansion device (18) on the basis of a pressure of the refrigerant, in particular a high pressure downstream of the cooling component (16) and/or downstream of the second compressor (14), wherein, as a function of a degree of opening of the expansion device (18), expansion of the refrigerant downstream of the expansion device (18) can be controlled.

S64. The cooling system (10) according to any of the preceding embodiments having the features of embodiment S14 and S62, wherein the circuit control is designed to control an opening of the expansion device (18) on the basis of a pressure of the refrigerant downstream of the heat exchanger (48).

S65. The cooling system (10) according to any of the preceding embodiments having the features of embodiment S62, wherein the expansion device (18) has a valve and is designed to gradually or continuously adapt an opening of the valve in a range from completely closed to completely open on the basis of a control actuation by the circuit control.

S66. The cooling system (10) according to any of the preceding embodiments having the features of embodiment S62, wherein the circuit control is designed to control an opening of the expansion device (18) on the basis of a temperature of the refrigerant upstream of the first compressor (12) and/or downstream of the evaporator (11), in particular a temperature at an evaporator outlet.

S67. The cooling system (10) according to any of the preceding embodiments, wherein an expansion of the refrigerant downstream of the expansion device (18) can be controlled as a function of a degree of opening of the expansion device (18).

S68. The cooling system (10) according to any of the preceding embodiments having the features of embodiment S62, wherein the circuit control is designed to determine a predetermined temperature value and to control an opening of the expansion device (18) when the predetermined temperature value is exceeded by a detected temperature, in particular an evaporator outlet temperature.

S69. The cooling system (10) according to any of the preceding embodiments having the features of embodiment S21 and S62, wherein the circuit control is designed to control an opening of the further expansion device (46) as a function of a temperature of the refrigerant downstream of the first compressor (12) and/or downstream of the second compressor (14), in particular a compressor outlet temperature or hot gas temperature, wherein, as a function of a degree of opening of the further expansion device (46), expansion of the refrigerant downstream of the further expansion device (46) can be controlled.

S70. The cooling system (10) according to any of the preceding embodiments having the features of the embodiments S37 and S62, wherein the circuit control is designed to control an opening of the high-pressure control apparatus (74) as a function of a pressure of the refrigerant downstream of the second compressor (14) and/or upstream of the high-pressure control apparatus (74).

S71. The cooling system (10) according to any of the preceding embodiments having the features of the embodiments S14, S29 and S70, wherein the circuit control is designed to control the high-pressure control apparatus (74) as a function of a pressure downstream of the heat exchanger (48) and/or upstream of the filter dryer (34).

S72. The cooling system (10) according to any of the preceding embodiments, comprising a compressor drive apparatus that is designed to drive the first compressor (12) and/or the second compressor (14).

S73. The cooling system (10) according to any of the preceding embodiments having the features of embodiment S72, wherein the compressor drive apparatus is designed to control a respective compressor speed of the first compressor (12) and/or the second compressor (14) as a function of a pressure of the refrigerant, in particular an evaporation pressure, and/or a temperature of the refrigerant, in particular an evaporation temperature, downstream of the expansion device (18), wherein a compression capacity of the first compressor (12) and/or the second compressor (14) can be controlled as a function of a compressor speed.

S74. The cooling system (10) according to any of the preceding embodiments having the features of embodiments S62 and S72, wherein the first compressor (12), the second compressor (14) and/or the compressor drive apparatus in each case has/have a drive and is/are designed to gradually or continuously adapt a speed of the respective drive on the basis of control actuation by the circuit control in a predetermined range from a minimum speed to a maximum speed.

S75. The cooling system (10) according to any of the preceding embodiments having the features of embodiment S62, wherein the circuit control is designed to control the compressor speed on the basis of a predetermined evaporation temperature.

S76. The cooling system (10) according to any of the preceding embodiments having the features of embodiment S62, wherein the circuit control is designed to increase the compressor speed in order to lower the evaporation temperature and/or is designed to reduce the compressor speed in order to increase the evaporation temperature.

S77. The cooling system (10) according to any of the preceding embodiments, wherein the cooling component (16) comprises a fan that is designed to direct an air flow through the cooling component (16) for cooling.

S78. The cooling system (10) according to any of the preceding embodiments, wherein the cooling component (16) comprises a refrigerant-brine heat exchanger that is designed to transfer heat from the refrigerant to a brine.

S79. The cooling system (10) according to any of the preceding embodiments having the features of embodiment S62 and S77, wherein the circuit control is designed to control a fan speed of the fan as a function of a temperature of the refrigerant downstream of the cooling component (16), in particular a cooling component outlet temperature, wherein a cooling performance of the cooling component (16) is controllable as a function of a fan speed.

S80. The cooling system (10) according to any of the preceding embodiments having the features of embodiment S62 and S77, wherein the fan is designed to gradually or continuously adapt the fan speed on the basis of control actuation by the circuit control in a predetermined range from a minimum speed to a maximum speed.

S81. The cooling system (10) according to any of the preceding embodiments having the features of the embodiments S62 and S77, wherein the circuit control is designed to control the fan as a function of a thermal load in a plurality of stages, wherein the fan speed is zero in a first control stage, the fan rotates at a first speed greater than zero in a second control stage and/or rotates at a second speed in a third control stage, wherein the second speed is greater than the first speed.

S82. The cooling system (10) according to any of the preceding embodiments having the features of embodiment S62, wherein the circuit control is designed to control the pressure in the tertiary pressure range in such a way that a cooling performance is maximized.

S83. The cooling system (10) according to any of the preceding embodiments having the features of embodiment S62, wherein the circuit control is designed to control superheating at the evaporator (11) by means of the expansion device (18) in such a way that the superheating is minimal, wherein the superheating is preferably at least 3 K at a compressor inlet.

S84. The cooling system (10) according to any of the preceding embodiments having the features of the embodiments S21 and S62, wherein the circuit control is designed to control a respective compressor outlet temperature at the first compressor (12) and/or at the second compressor (14) by means of the further expansion device (46) in such a way that said compressor outlet temperature falls below a predetermined limit temperature.

S85. The cooling system (10) according to any of the preceding embodiments having the features of embodiment S12, wherein cooled refrigerant from the return portion (44) can be injected at the second connection point (44) in order to lower a compressor outlet temperature.

S86. The cooling system (10) according to any of the preceding embodiments having the features of embodiment S62, wherein the circuit control is designed to continuously control a first compressor speed of the first compressor and a second compressor speed of the second compressor, and wherein the circuit control is designed to control the first compressor speed and the second compressor speed independently of one another.

S87. The cooling system (10) according to any of the preceding embodiments having the features of the embodiment S62, wherein the circuit control is designed to accelerate the first compressor and/or the second compressor to a respective predetermined setpoint speed in a starting phase with a respective predetermined acceleration value, wherein an acceleration is preferably less than or equal to 8 revolutions/$s^2$.

S88. The cooling system (10) according to any of the preceding embodiments having the features of the embodiments S77 and S87, wherein the circuit control is designed to control, in particular continuously control, a speed of the fan as a function of an acceleration of the first compressor and/or an acceleration of the second compressor.

S89. The cooling system (10) according to any of the preceding embodiments having the features of embodiment S88, wherein a control characteristic curve of the fan leads ahead of a control characteristic curve of the first compressor and/or the second compressor.

S90. The cooling system (10) according to any of the preceding embodiments having the features of the embodiments S62 and S77, wherein the circuit control is designed to control a fan speed of the fan as a function of an ambient temperature, in particular proportional to the ambient temperature, wherein the ambient temperature can be detected on the laboratory instrument, preferably at an air outlet of the cooling component.

S91. The cooling system (10) according to any of the preceding embodiments having the features of embodiment S62, wherein the circuit control is designed to control the expansion device as a function of an outlet temperature of the cooling component and/or an ambient temperature in order to set a pressure in the tertiary pressure range, in particular an optimal high pressure.

S92. The cooling system (10) according to any of the preceding embodiments having the features of embodiment S91, wherein the expansion device comprises a thermostatic valve or an electronic expansion valve.

S93. The cooling system (10) according to any of the preceding embodiments having the features of embodiment S62, wherein the circuit control is designed to detect a change in ambient temperature and to control the expansion device, the compressor speeds and/or a fan speed on the basis of the ambient temperature change.

Laboratory instrument embodiments are mentioned below. These embodiments are abbreviated with the letter "L" followed by a number. Whenever reference is made below to "laboratory instrument embodiments," these embodiments are intended. Any feature of any laboratory embodiment can be combined with any feature of any other laboratory embodiment.

L1. A laboratory instrument (300) having a cooling system.

L2. The laboratory instrument according to the preceding embodiment, wherein the cooling system is designed according to any of the preceding system embodiments.

L3. The laboratory instrument according to the preceding embodiment, wherein the laboratory instrument is a centrifuge and/or the laboratory instrument is a table-top instrument or a stand-alone instrument.

L4. The laboratory instrument according to any of the preceding embodiments, wherein the laboratory instrument comprises a rotor tank (301) on which a/the evaporator (11) is arranged.

L5. The laboratory instrument according to any of the preceding embodiments having the features of embodiment L4, wherein the evaporator comprises an evaporator coil (302) that is arranged on an outer side of the rotor tank, wherein the evaporator coil is formed by a circumferential line.

L6. The laboratory instrument according to any of the preceding embodiments having the features of the embodiment L5, wherein the evaporator coil has a shape that is flattened on at least one side, in particular a D-shape, in order to form a flat side, and wherein the flat side bears against the outer surface of the rotor tank in order to form a surface contact.

L7. The laboratory instrument according to any of the preceding embodiments having the features of embodiment L6, wherein the evaporator coil has an outer tube diameter in a range of from 5 mm to 20 mm, preferably 10 mm or 16 mm, and/or wherein the evaporator coil has a wall thickness of 0.5 mm to 5 mm, preferably a wall thickness of 1 mm.

L8. The laboratory instrument according to any of the preceding embodiments having the features of embodiment L4, wherein the rotor tank has a side jacket surface, a bottom jacket surface and a bottom surface, wherein the side jacket surface is cylindrical, and wherein the bottom jacket surface has a curved profile and is designed to connect the side jacket surface to the bottom surface.

L9. The laboratory instrument according to any of the preceding embodiments having the features of embodiments L5 and L8, wherein the evaporator coil is arranged on the side jacket surface, the bottom jacket surface and/or the bottom surface.

L10. The laboratory instrument according to any of the preceding embodiments having the features of the embodiments L5 and L8, wherein the evaporator coil forms a surface contact on the side jacket surface.

FIGURES

It is noted that not all drawings bear all reference signs. Instead, in some of the drawings, some of the reference signs have been omitted for brevity and ease of presentation. Embodiments of the present invention are described below with reference to the accompanying drawings.

Embodiments of the invention allow the efficient use of $CO_2$ as a refrigerant in a cooling system. In particular, the cooling system is designed for heat dissipation in a laboratory instrument 300, specifically in a centrifuge. In this case, an operating mode of the cooling system can be optimized by means of heat flows and/or refrigerant flows in addition to the main circuit, and the efficiency of the cooling system can correspondingly be increased.

The figure variants A and B of FIGS. 1 to 6 each form a unit consisting of a schematic circuit diagram and a corresponding log-p enthalpy diagram. In this case, process points that describe a state of the refrigerant are identified in the circuit diagram and in the log-p enthalpy diagram as a number with a rectangular marking.

The specific enthalpy of the refrigerant used ($CO_2$) is plotted on the x-axis (see, for example, FIG. 1B) and the pressure is plotted on the y-axis, wherein the y-axis is logarithmic. The diagram has a bell-shaped curve whose left region is provided with the reference sign 802 and right region is provided with the reference sign 804.

In the region that is delimited by this bell-shaped curve 802, 804, i.e., in the region that is arranged below this curve 802, 804 in the illustration, the refrigerant is present as wet vapor, i.e., in a mixture of the liquid and the gaseous state. To the left of the curve region 802, the refrigerant is in the liquid phase, and the curve region 802 is also referred to as the boiling point curve. To the right of the curve region 804, the refrigerant is in the gas phase, and the curve region 804 is also referred to as the dew point curve.

The boiling point curve 802 and the dew point curve 804 meet at the critical point. Above this point (i.e., at a pressure that exceeds the critical pressure), no distinction can be made between the gas and liquid phases, such that this region is also referred to as the transcritical region.

Figure 1B:
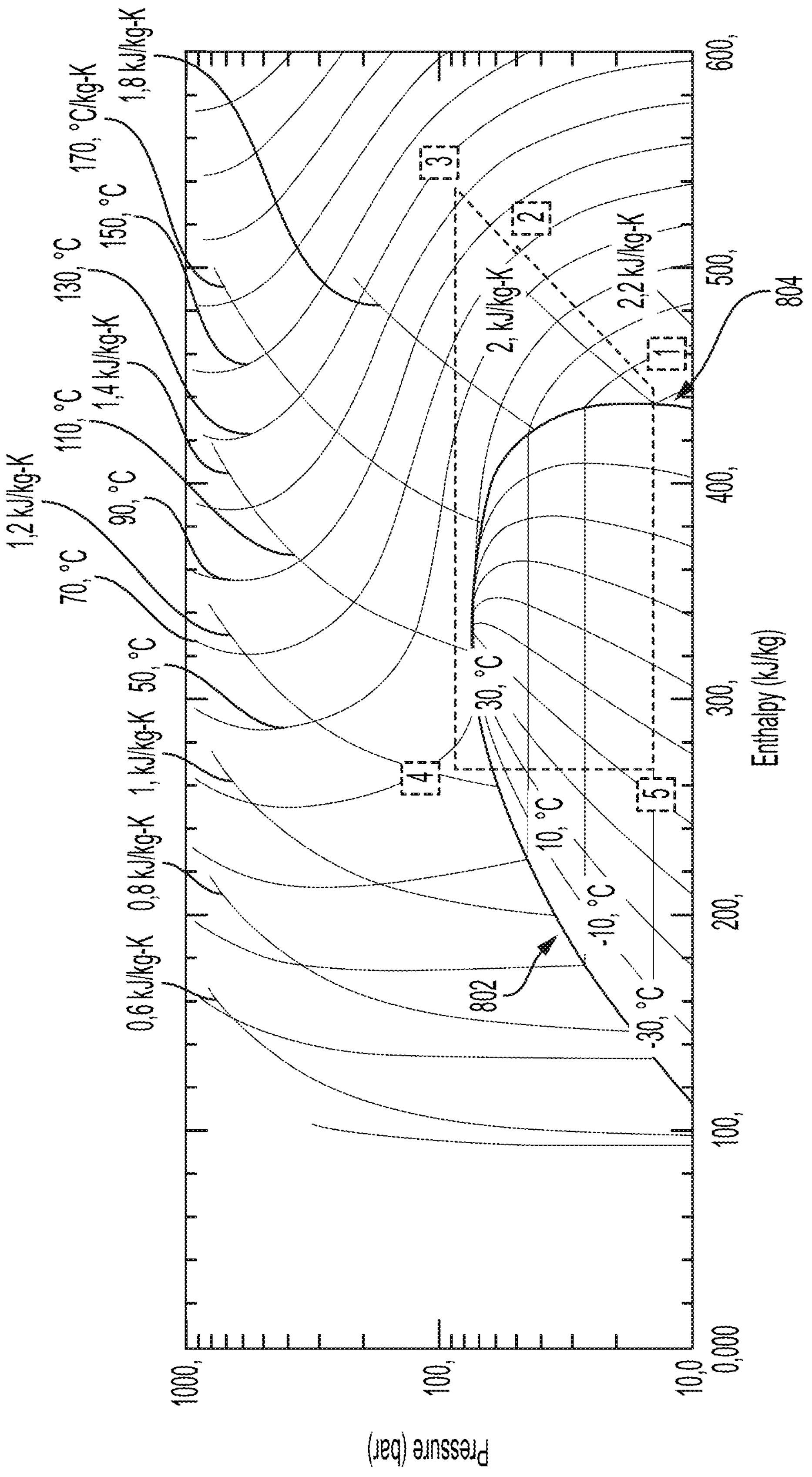
FIG. 1B is an enthalpy-pressure diagram of a cycle of an embodiment of the cooling system of FIG. 1A.

In the diagram of FIG. 1B, a diagram showing a refrigeration process according to an embodiment of the invention is represented by straight lines. This cooling process can be used in the embodiment of FIG. 1A.

The cooling system can have a plurality of sensors 60 that are each designed to detect a pressure and/or a temperature. Accordingly, the temperature and pressure within the system 10 can be determined at different locations. A cooling system having two-stage compression is shown in FIGS. 1A and 1B.

The cooling system 10 is also referred to simply as system 10. The system 10 has the following: an evaporator 11, a first compressor 12, a second compressor 14, a first cooling component 16 and a first expansion device 18 that can be designed, for example, as an expansion valve 18 and is also referred to simply as an expansion valve 18 below. In one embodiment, the first compressor 12 and the second compressor can be arranged in a housing, in particular in a common housing. A common drive can be provided for the first compressor 12 and the second compressor 14, which common drive is designed to drive both the first compressor 12 and the second compressor 14.

In addition, the cooling system 10 has a line system 20 that comprises a plurality of lines 20', 21', wherein the symbol ' stands for a number, which lines connect further components of the system 10 to one another.

The system 10 forms a first circuit in which the evaporator 11, the first compressor 12, the second compressor 14, the cooling component 16 and the expansion valve 18 are connected to one another in this order, wherein the evaporator 11, following this order, is again connected to the expansion valve 18; this circuit is also referred to as the main circuit. In particular, the first compressor 12 and the second compressor 14 are arranged between the evaporator 11 and the cooling component 16 and are provided in series with one another.

Furthermore, the system 10 has a filter dryer 34 that is arranged between the first cooling component 16 and the expansion valve 18. The filter dryer 34 can be arranged upstream of the expansion device 18 in the main circuit.

The terms "upstream" and "downstream" are used in various places in this document. For example, looking at FIG. 1A, it should be clear that the refrigerant runs counterclockwise, such that, for example, the expansion device 18 is arranged downstream of the filter dryer 34.

At the same time, it should be noted that the process used is a cyclic process. After the refrigerant has left the expansion device 18, after a certain time it will have run through the evaporator 11, the two compressors 12 and 14 and the cooling component 16 and then come back to the filter dryer 34.

However, it should be understandable that the process engineering connection between the filter dryer 34 and the expansion device 18 is shorter than from the expansion device 18 (via the other elements) to the filter dryer 34. For the terms "upstream" and "downstream" in this document, the shorter process engineering connection between two elements is therefore considered. For example, as discussed, the expansion device 18 is located downstream of the filter dryer 34 and the evaporator 11 is arranged downstream of the expansion device 18. Another example is the second compressor 14, which is arranged downstream of the evaporator 11.

When this document states that an element is arranged between two further elements, this refers to the process engineering arrangement between the connection of the further elements, which connection is shorter from the point of view of process engineering. In the embodiment shown in FIG. 1A, the first compressor 12 is arranged in this sense between the evaporator 11 and the second compressor 14, for example.

A first compression can be achieved by means of the first compressor 12 and a second compression can be achieved by means of the second compressor 14 in order to bring the refrigerant from a low pressure at the outlet of the evaporator 11 to a high pressure at the outlet of the second compressor 14. The cooling component 16 implements an enthalpy reduction in order to dissipate heat absorbed at the compressor 11 from the system 10. With this cooling, the refrigerant can change from a gas phase to a liquid phase. The expansion device 18 can now convert the refrigerant from the liquid phase to the wet vapor phase by means of a pressure reduction and make it available to the evaporator for heat absorption.

With reference to FIGS. 1A and 1B, the cooling circuit can be described as follows: the process points are identified in the corresponding FIGS. A and B by a number in a rectangle. Process point 1 is downstream of the evaporator 11 and upstream of the first compressor 12. At said process point 1, the refrigerant is present in a gaseous form, at a relatively lower temperature and at a relatively low pressure.

At process point 2, which is between the first compressor 12 and the second compressor 14, the refrigerant is in a gaseous form, at an intermediate pressure and at an intermediate temperature.

At process point 3, which is between the second compressor 14 and the cooling component 16, the refrigerant is at a high pressure and at a high temperature. In the embodiment shown, the refrigerant is transcritical at said process point 3. It is pointed out, however, that this is not necessary and that the refrigerant in process point 3 can also be present in a gaseous form. In these embodiments, process point 3 (or generally the process point between the second compressor 14 and the cooling component 16) in the diagram according to FIG. 1B is therefore arranged below the critical pressure with regard to the pressure, and this also applies to the other embodiments.

The refrigerant is cooled by means of the cooling component 16, such that it is present at a high pressure and a low temperature at process point 4, which is between the cooling component 16 and the expansion device 18. In the embodiment shown, the refrigerant at process point 4 is transcritical. However, it is also possible in this case for the refrigerant to be present in a different phase at said process point 4 (or generally at the process point between the cooling component 16 and the expansion device 18), in particular as wet vapor. Again, in such embodiments, the phase diagram according to FIG. 1B is such that the pressure at the corresponding process point (here: process point 4) is less than the critical pressure, and this possibility also exists in the embodiments described below.

The refrigerant can then be expanded by means of the expansion device 18, such that it is present as wet vapor at a low pressure and low temperature at process point 5 between the expansion device 18 and the evaporator 11.

The refrigerant can then be evaporated by means of the evaporator 11, such that it is present at a low pressure and at a low temperature at process point 1 between the evaporator 11 and the first compressor 12. In the embodiment shown, the refrigerant is in a gaseous form at process point 1.

Figure 2A:
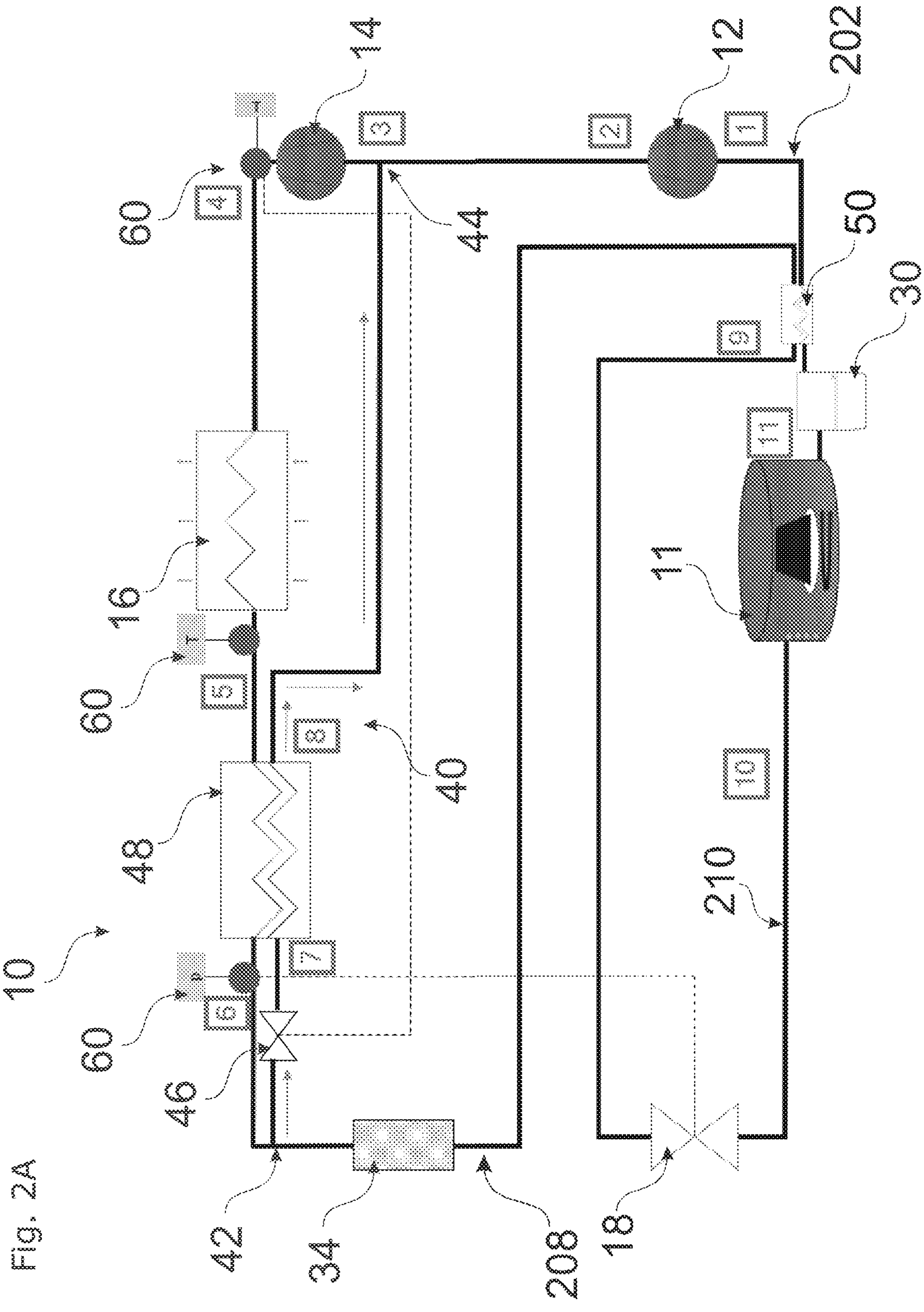
FIG. 2A is a schematic view of a cooling system according to an embodiment.
Figure 2B:
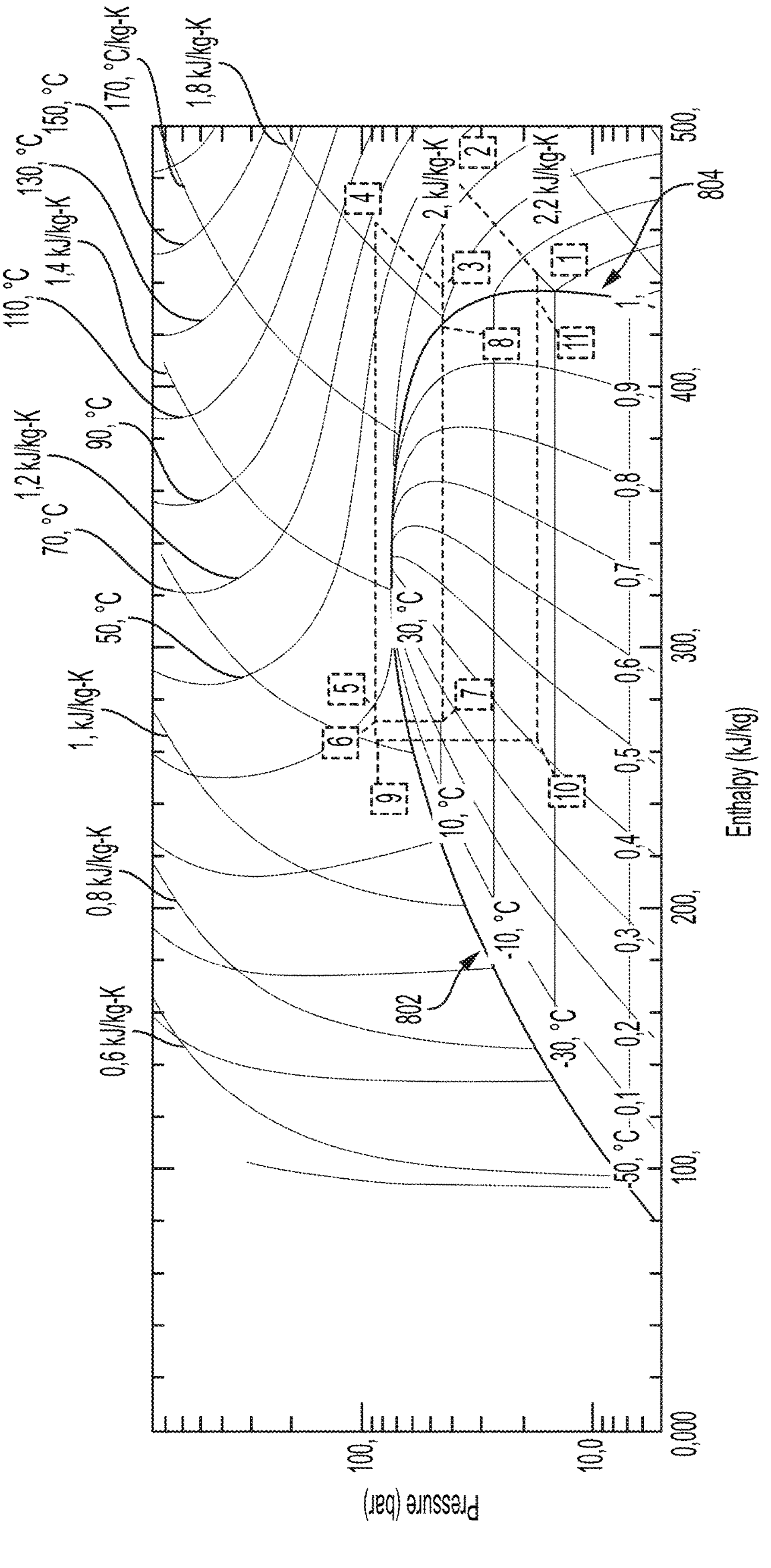
FIG. 2B is an enthalpy-pressure diagram of a cycle of an embodiment of the cooling system according to FIG. 2A.

Compared to the cooling system according to FIGS. 1A and 1B, the embodiment shown in FIGS. 2A and 2B is supplemented by the following (i.e., additionally has): a liquid separator 30 that is arranged between the evaporator 11 and the first compressor 12.

In addition to the circuit described, the system 10 also has a return portion 40 that is fluidly connected to the circuit at two connection points 42 and 44 that are also referred to simply as connections. The first connection point 42 is provided between the first cooling component 16 and the expansion valve 18, and the second connection point 44 is provided between the first compressor 12 and the second compressor 14.

The return portion 40 also has an expansion device 46 (which is also referred to as an expansion valve 46) and runs through a heat exchanger 48 that is also run through by the circuit described and in particular by a line 208 that connects the cooling component 16 to the expansion valve 18.

The system 10 comprises a further heat exchanger 50 through which the line 208 flows on the one hand and through which the line 202 flows on the other hand, which connects the evaporator 11 to the first compressor 12.

The further expansion device 46 can be regulated in particular as a function of a high pressure and/or a hot gas temperature at an outlet of the second compressor 14. A refrigerant flow can thus be reduced or increased through the return portion 40 in order to correspondingly reduce or increase the hot gas temperature. Furthermore, the additional expansion device 46 can implement post-expansion of the refrigerant in the high-pressure region. As a result, refrigerant having a lower enthalpy (e.g. according to process point 8 in FIG. 2A/2B) can be mixed with refrigerant having a higher enthalpy (e.g. according to process point 2 in FIG. 2A/2B). The mixing at the second connection point 44 and/or the flow through the heat exchanger 48 can increase the enthalpy in order to avoid wet suction, i.e., suction of refrigerant having a partially liquid phase and/or refrigerant in the wet vapor phase before the second compressor 14, or at least reduce the likelihood of wet suction.

The expansion device 18 can be regulated as a function of a pressure and/or a temperature at an outlet of the heat exchanger 48. In this case, this pressure at the outlet of the heat exchanger can be substantially equal to a pressure at the inlet of the expansion device 18.

With regard to the phase diagram of FIG. 2B, reference can initially be made in principle to the description of the phase diagram according to FIG. 1B, wherein it should be understandable to a person skilled in the art that the process points substantially correspond as follows (taking into account the additions below):

| Process point FIG. 1B | Process point FIG. 2B |
|---|---|
| 1 | 1 |
| 2 | 2 |
| 3 | 4 |
| 4 | 9 |
| 5 | 10 |

The embodiment of FIG. 2A, 2B has a return portion 40 in addition to the main circuit. In addition, this embodiment also has, among other things, a heat exchanger 48 that is arranged downstream of the cooling component 16. The refrigerant downstream of the cooling component 16 is further cooled by means of the heat exchanger 48, such that downstream thereof (at process point 6) it is present at an even lower temperature than at process point 5.

A further heat exchanger 50 is arranged in the main circuit further downstream, which further heat exchanger cools the refrigerant even further, such that downstream thereof, at process point 9 (FIGS. 2A/2B), it is present at an even lower temperature.

The refrigerant can then be expanded again—as described above—by means of the expansion valve 18 and is thus present as wet vapor at process point 10.

The refrigerant can in turn be evaporated by means of the evaporator 11. However, it is possible that the evaporation is not complete, such that the refrigerant is present directly downstream of the evaporator (at process point 11, FIGS. 2A/2B) near the dew point curve and liquid components are present in the refrigerant. Such liquid can be separated by means of the liquid separator 30 that is arranged downstream of the evaporator 11, and additional energy can be introduced into the refrigerant between the evaporator 11 and the first compressor 12 by means of the heat exchanger 50 already described, such that the refrigerant is present in a gaseous form at process point 1.

A return portion 40 is arranged between the connection points 42 and 44. An expansion device 46 is arranged in the return portion 40 downstream of the connection point 42, which expansion device can be designed as an expansion valve, for example. Downstream thereof, at process point 7, the intermediate-pressure refrigerant is in the form of wet vapor at a relatively low temperature. The refrigerant can be heated by the heat exchanger 48. In the embodiment shown here, the refrigerant is heated up to the dew point, but it is also possible that the refrigerant is present downstream of the heat exchanger 48 (i.e., at process point 8) as wet vapor or in a gaseous form. Overall, the system is operated in such a way that the specific enthalpy that results from the mixing of the refrigerants at connection 44 (i.e., at process point 3) is suitable for the further cycle process.

The use of the return portion 40 thus makes it possible overall to provide post-injection of refrigerant and to regulate the hot gas temperature at the outlet of the second compressor 14 in this way. This allows variable thermal loads to be taken into account.

The use of post-injection and one or more internal heat exchangers can increase the COP (coefficient of performance). The COP can be defined as the ratio of a cooling capacity to an electrical power, in particular a consumed electrical power.

As a result of the post-injection, the process point 4 in the log (p)-h diagram (FIGS. 3A/3B) can be shifted further to the left, i.e., in the direction of lower enthalpy. In addition, it should be understandable that, due to the heat exchanger 48, the refrigerant has a lower enthalpy at process point 7 than at process point 6, such that the refrigerant is present at a lower enthalpy after isenthalpic (i.e., in FIG. 3B: vertical) expansion between process points 11 and 12 at process point 12 than in the case that no heat exchanger is provided.

The heat exchanger 48 can be designed as an economizer heat exchanger, for example. Said heat exchanger is arranged upstream of the valve 18 and can thus further supercool the refrigerant. This can lead to a greater specific evaporation capacity q and thus to a smaller required mass flow and, as a result, lower compressor speeds. It is therefore possible to use the post-injection to adapt to the required evaporation capacity and thus increase said evaporation capacity.

A further embodiment of the present invention is described with reference to FIGS. 3A and 3B. The system 10 also has a second cooling component 32 that is arranged between the first compressor 12 and the second compressor 14.

Figure 3A:
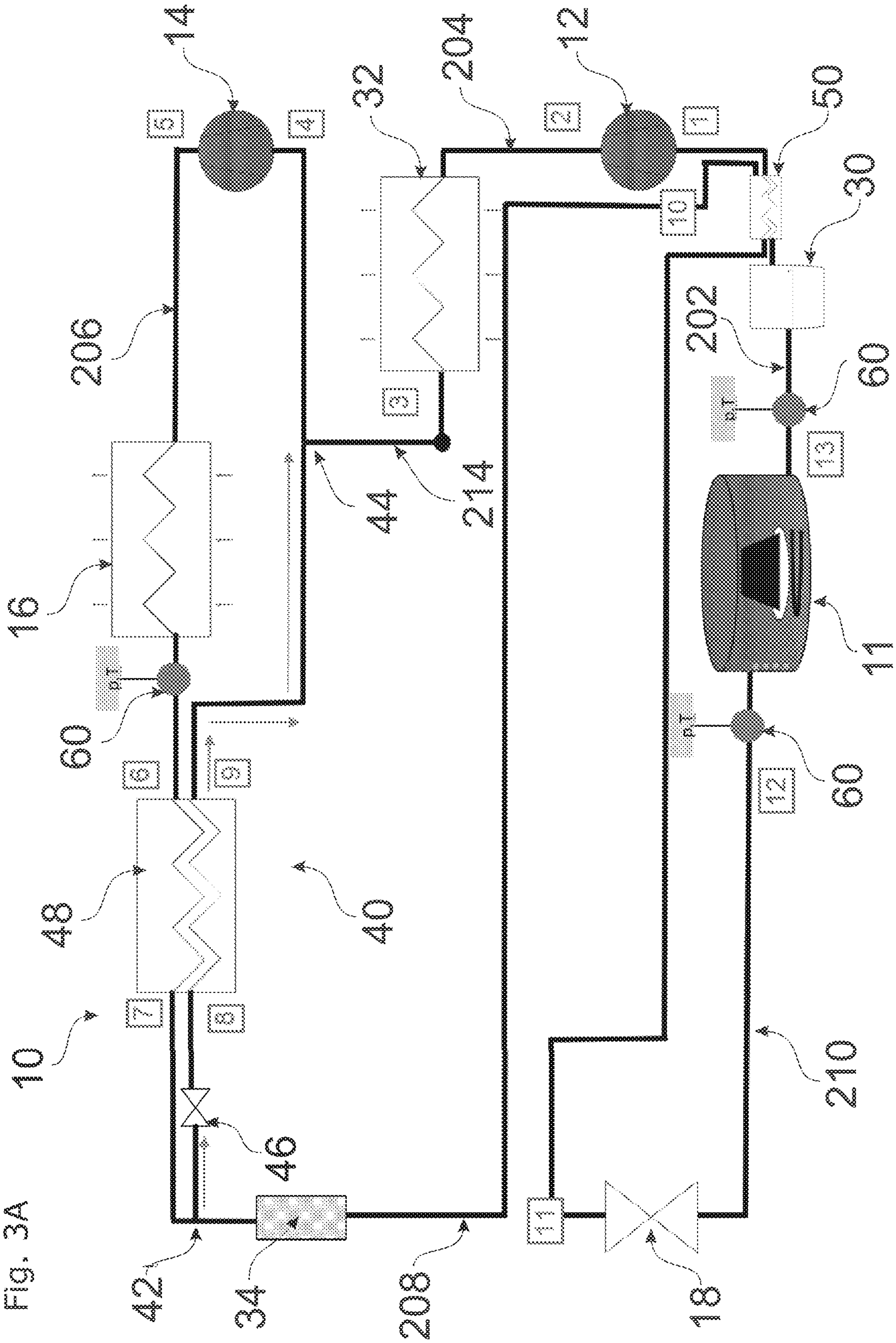
FIG. 3A is a schematic view of a cooling system according to an embodiment.
Figure 3B:
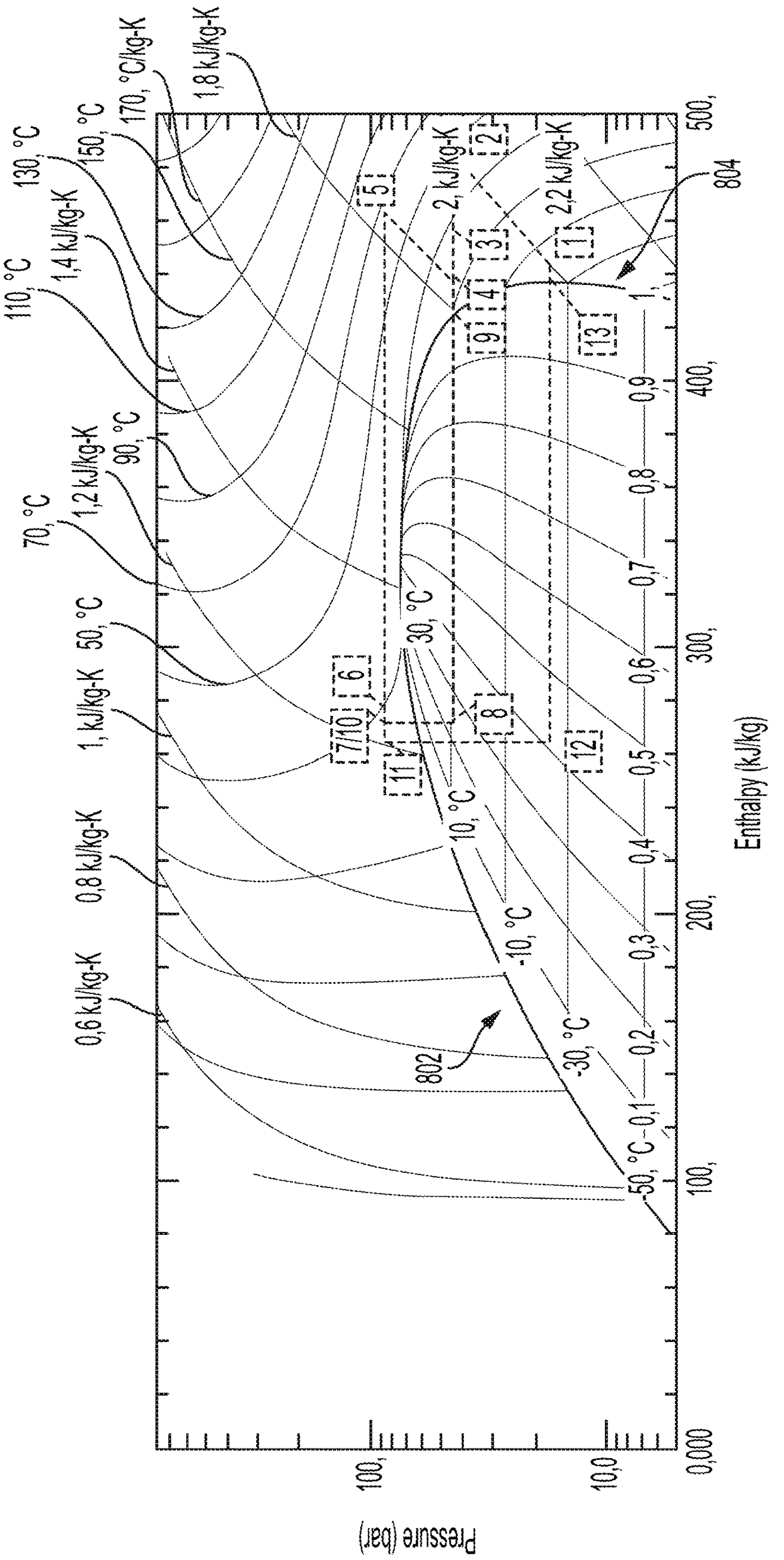
FIG. 3B is an enthalpy-pressure diagram of a cycle of an embodiment of the cooling system according to FIG. 3A.

A refrigeration process that can be used by the cooling system 10 according to the embodiment shown in FIG. 3A is depicted in the diagram of FIG. 3B. The reference signs 1 to 13 shown in rectangular boxes correspond to one another in FIGS. 10A and 10B.

The states of the refrigerant at the different points can be summarized as follows:

| Process point | State of the refrigerant |
|---|---|
| 1 | gaseous, low pressure, low temperature |
| 2 | gaseous, intermediate pressure, intermediate temperature |

-continued

| Process point | State of the refrigerant |
|---|---|
| 3 | gaseous, intermediate pressure, low temperature (less than 2) |
| 4 | gaseous, intermediate pressure, low temperature (less than 3) |
| 5 | transcritical, high pressure, high temperature |
| 6 | transcritical, high pressure, low temperature (less than 5) |
| 7 | transcritical, high pressure, low temperature (less than 6) |
| 8 | wet vapor, intermediate pressure, low temperature |
| 9 | gaseous, intermediate pressure, low temperature |
| 10 | transcritical, high pressure, low temperature (same as 7) |
| 11 | transcritical, high pressure, low temperature (less than 10) |
| 12 | wet vapor, low pressure, low temperature |
| 13 | gaseous, low pressure, low temperature |

In some embodiments, the refrigerant at process point 5 can also be gaseous. Alternatively or additionally, the refrigerant at process points 6, 7, 10 and 11 can also be liquid.

If one considers the refrigerant at process point 1 (see FIGS. 3A and 3B), i.e., upstream of the first compressor 12, the refrigerant is in a gaseous form, at a low pressure and at a low temperature.

The refrigerant is compressed in the first compressor 12, such that it is present in a gaseous form and at an intermediate pressure downstream of the first compressor 12 (i.e., at process point 2). Compression also heats the refrigerant, such that it is at an intermediate temperature.

In the cooling component 32, the refrigerant is cooled, such that it is gaseous downstream thereof (at process point 3), at an intermediate pressure and at a low temperature (i.e., at a lower temperature than at process point 2), for example at approx. 28° C. The cooling component 32 can be provided in particular at higher evaporation temperatures.

Said refrigerant is mixed with refrigerant from the return portion 40, wherein the refrigerant from the return portion 40 is even colder, such that the refrigerant at process point 4, which is between the connection 44 and the second compressor 14, is gaseous, at an intermediate pressure and at a low temperature, wherein said temperature is even lower than at process point 3.

In the second compressor 14, the refrigerant is further compressed. In particular, the compression here takes place in such a way (see FIG. 3B) that the refrigerant can be compressed to a pressure beyond the critical pressure. Downstream of the second compressor 14 at process point 5, the refrigerant is therefore transcritical and at a high pressure (in embodiments of the invention it is also possible for the refrigerant at process point 5 to be in a gaseous form). In addition, the refrigerant was also heated by the compression, such that it is also at a high temperature.

The refrigerant is cooled by means of the cooling component 16. Downstream of the cooling component, at process point 6, the refrigerant is therefore transcritical (liquid in other possible embodiments), at a high pressure and at a low temperature (wherein said temperature is lower than at process point 5).

The refrigerant can be further cooled by means of a heat exchanger 48. Downstream of the heat exchanger 48, at process point 7, the refrigerant is therefore transcritical (also liquid in some embodiments), at a high pressure and at a low temperature (wherein said temperature is even lower than at process point 6).

If one first follows the main circuit, the refrigerant is guided downstream of process point 6 through the filter dryer 34, which has no influence or a negligible influence on the state variables of the refrigerant, such that the state downstream of said dryer 34, at process point 10, is at least substantially identical to the state at process point 7. A minimal pressure drop can occur at the filter dryer 34, but it is negligible relative to pressure changes due to the expansion device 11 and the compressors 12 and 14. The filter dryer 34 can also be arranged in the main circuit downstream of a further heat exchanger 50.

In the illustrated embodiment, the refrigerant is further cooled downstream of the filter dryer 34 by a heat exchanger 50, such that, downstream of the heat exchanger 50 (at process point 11), it is transcritical (also gaseous in some embodiments), at a high pressure and at a low temperature (which is even lower than at process points 7 and 10).

Further down the process, the refrigerant is passed through the expansion valve 18, thereby being expanded and converted to the wet vapor. Downstream of the expansion valve 18 (i.e., at process point 12), the refrigerant is therefore present as wet vapor, at a low pressure and at a low temperature.

The refrigerant is then evaporated by the evaporator 11, i.e., it is ideally completely converted to the gaseous state. Downstream of the evaporator 11 (i.e., at process point 13), the refrigerant is therefore in a gaseous form (or according to FIG. 10B at the transition between wet vapor and the gaseous form), at a low pressure and at a low temperature. Deviating from ideal evaporation, the evaporator can at least in part only bring the refrigerant closer to the dew point curve 804 or bring it precisely up to the dew point. In this case, the liquid fractions of the refrigerant can be separated by a liquid separator 30 and/or the further heat exchanger 50 and/or converted to gaseous refrigerant.

The liquid separator 30 can be provided downstream of the evaporator 11 and at least in part remove liquid components in order to ensure that these do not reach components arranged downstream (and in particular not the compressors 12, 14). In this case, liquid components can be reduced, for example, in such a way that the formation of droplets at the compressor inlet is prevented or at least reduced.

Furthermore, downstream of the evaporator 11 and upstream of the first compressor 12, the refrigerant can pass through the heat exchanger 50 already described and thereby be heated, such that downstream thereof, at process point 1, the refrigerant is gaseous, at a low pressure and at a low temperature (but warmer than at process point 13), as a result of which the process cycle is closed. In particular in the event of incomplete evaporation in the evaporator, it can thereby be additionally ensured that no refrigerant in the liquid state or as little refrigerant in the liquid state as possible reaches the compressor 12 arranged downstream.

The previous paragraphs described how the refrigerant passes through the main circuit. In addition to this, a further return portion 40 can also be provided in embodiments of the invention. As can be seen in FIG. 10A, said return portion 40 can be connected to the main circuit via the connections 42 and 44. Connection 42 is in this case provided downstream of the heat exchanger 48 and upstream of the expansion valve 18, and upstream of the filter dryer 34 in the embodiment shown. Connection 44 is provided between first compressor 12 and second compressor 14.

Refrigerant is therefore supplied to the return portion in the state at process point 7, wherein said refrigerant is transcritical at a high pressure and at a low temperature.

In the return portion 40, the refrigerant passes through an expansion valve 46, by means of which the pressure of the refrigerant is reduced toward the intermediate pressure. Downstream of the expansion valve 46 (at process point 8), the refrigerant is in the form of wet vapor, at an intermediate pressure and at a low temperature.

Further downstream in the return portion 40, the refrigerant passes through the heat exchanger 48, which heats the refrigerant. The heating is such that the refrigerant evaporates, i.e., it is converted to the gaseous state, or at least brought to the dew point (i.e., to the transition between wet vapor and gas). Heating up to just below the dew point curve is also possible. The mixing enthalpy from process point 3 and process point 9 can ideally be in the gaseous range. For this purpose, the heat exchangers 32, 48 can be designed accordingly, and a degree of opening of the further expansion valve 46 can be adjusted accordingly to regulate the ratio of the mass flow in the return portion 40 and the mass flow in the main circuit. Downstream of the heat exchanger 48 (i.e., at process point 9), the refrigerant is again present in a gaseous form (or at the transition from wet vapor to gas, but possibly also as wet vapor), at an intermediate pressure and at a low temperature because the energy input via the heat exchanger is required for the phase transition. In particular, the refrigerant at process point 9 has a lower specific enthalpy than at process point 3, such that the mixture of said refrigerants (see process point 4) leads to a temperature drop in relation to process point 3.

According to the detailed description of the preceding embodiments, in which the cycle process shown in the respective "B" figures has been described in detail, it is pointed out that the following embodiments are described more briefly in the sense of a brief description. However, the statements made above with regard to the corresponding diagrams and with regard to the corresponding process apply equally to the embodiments described below, and a person skilled in the art will understand them on the basis of the diagrams and in connection with the detailed description above.

Figure 4A:
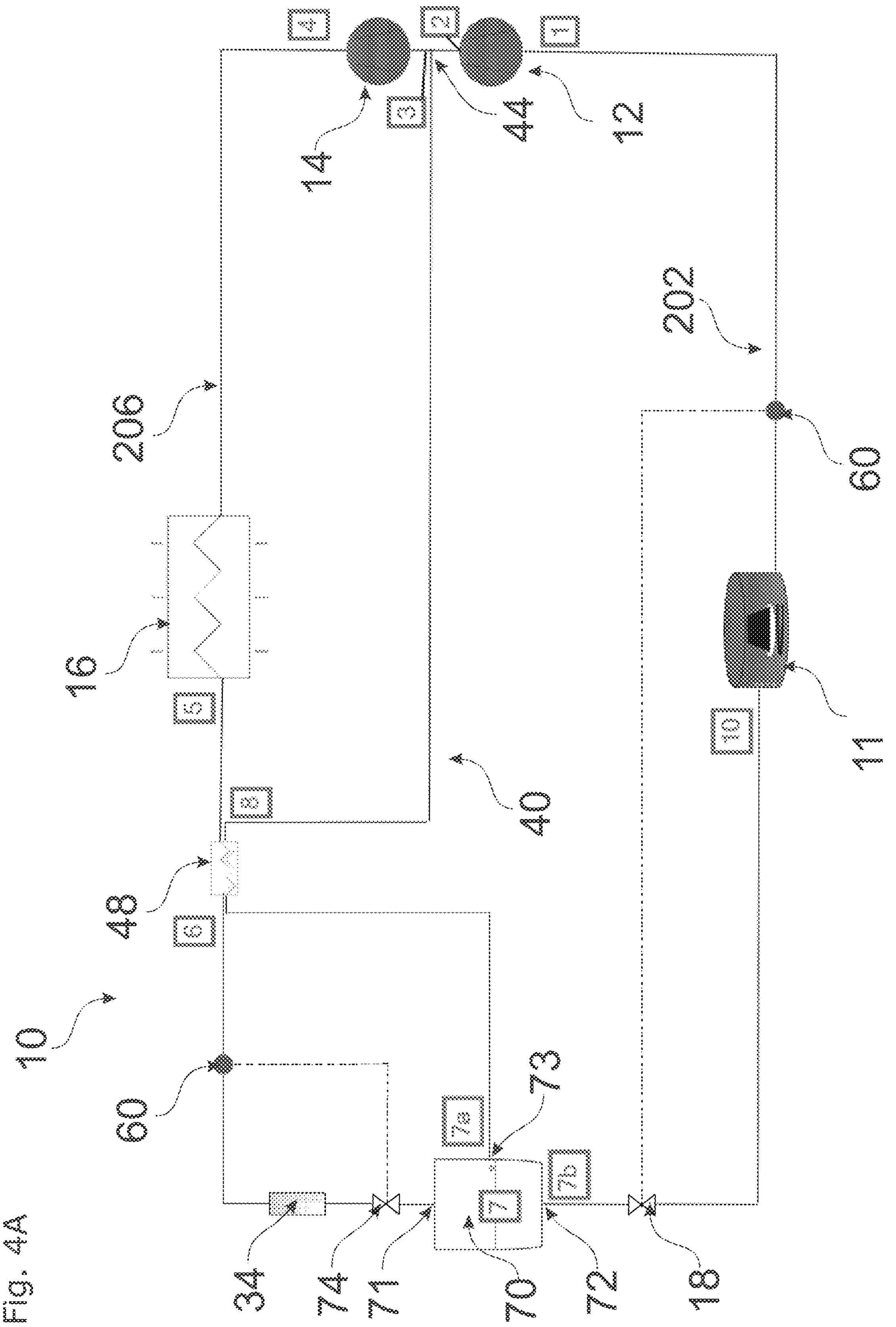
FIG. 4A is a schematic view of a cooling system according to an embodiment.
Figure 4B:
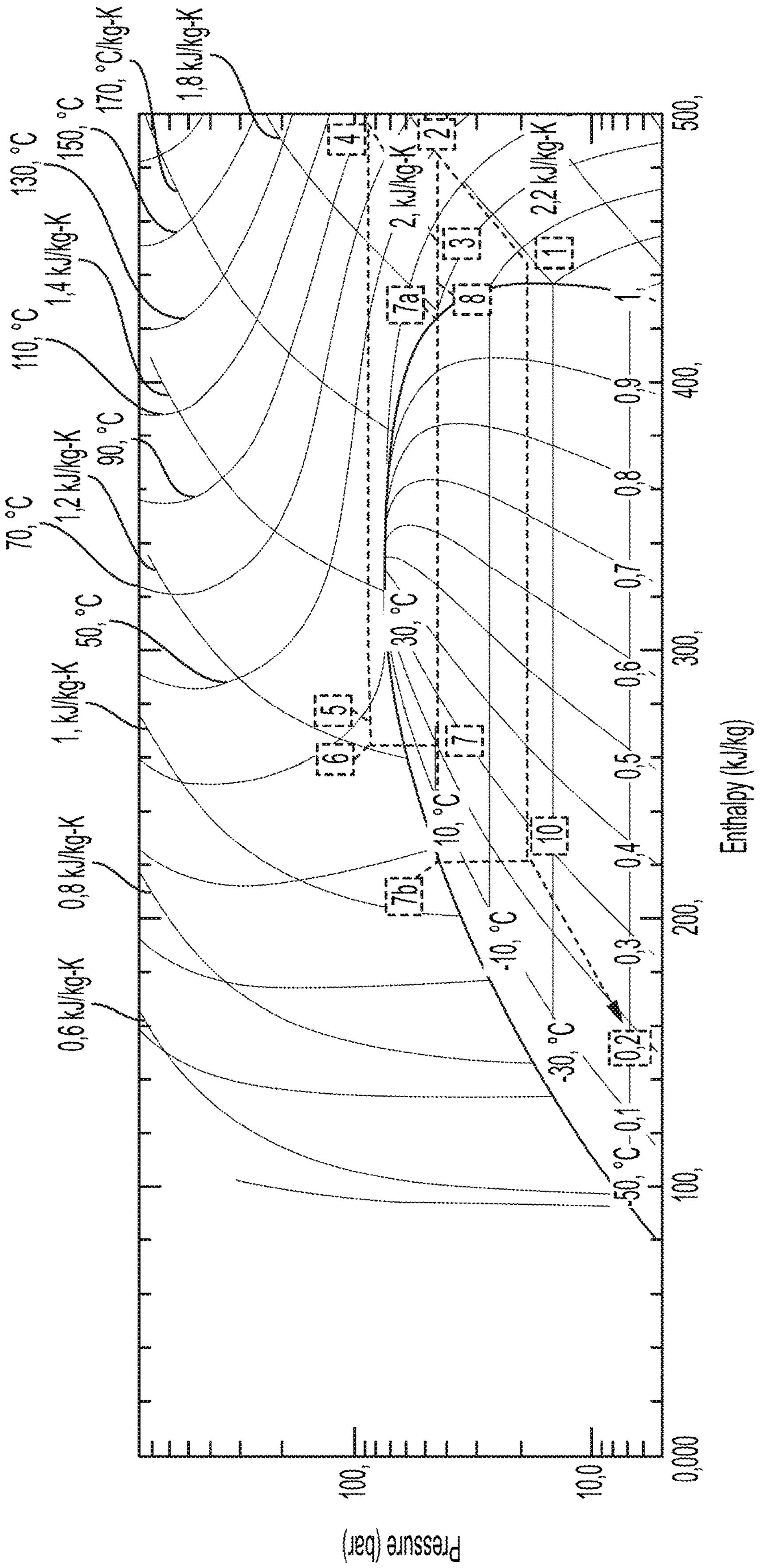
FIG. 4B is an enthalpy-pressure diagram of a cycle of an embodiment of the cooling system according to FIG. 4A.

According to an embodiment of the cooling system 10 shown in FIG. 4A and the corresponding Mollier diagram according to FIG. 4B, the first connection point can be supplemented or replaced by an intermediate-pressure vessel 70. In this case, a high-pressure control apparatus 74 can be arranged in the main circuit upstream of an inlet 71 of the intermediate-pressure vessel 70, which apparatus can be designed in particular as an expansion valve. The high pressure can be lowered to an intermediate pressure by means of the high-pressure control apparatus 74. In particular, a transition from the liquid phase or transcritical phase to the wet vapor phase can be implemented here. Liquid refrigerant can be conducted to the expansion device 18 via a first outlet 72 of the intermediate-pressure vessel 70, and/or at least partially gaseous refrigerant or refrigerant in the wet vapor phase can be introduced into the return portion 40 via a second outlet 73 of the intermediate-pressure vessel 70. In this case, the refrigerant can be drawn off from the second compressor 14 via the return portion 40. As an alternative to feeding in the refrigerant between the compressors 12 and 14 at an intermediate pressure, the refrigerant can be mixed with low-pressure refrigerant in the gas phase. For example, the second connection point 44 can couple the return portion 40 to the main circuit upstream of the first compressor 12.

A second heat exchanger 50 and/or a further cooling component 32 can be omitted with the use of an intermediate-pressure vessel 70. The expansion device 18 can be controlled on the basis of an evaporator outlet temperature that is detected, for example, by a sensor in the line portion 202. As a result, the expansion device 18 can regulate superheating of the refrigerant.

Figure 5A:
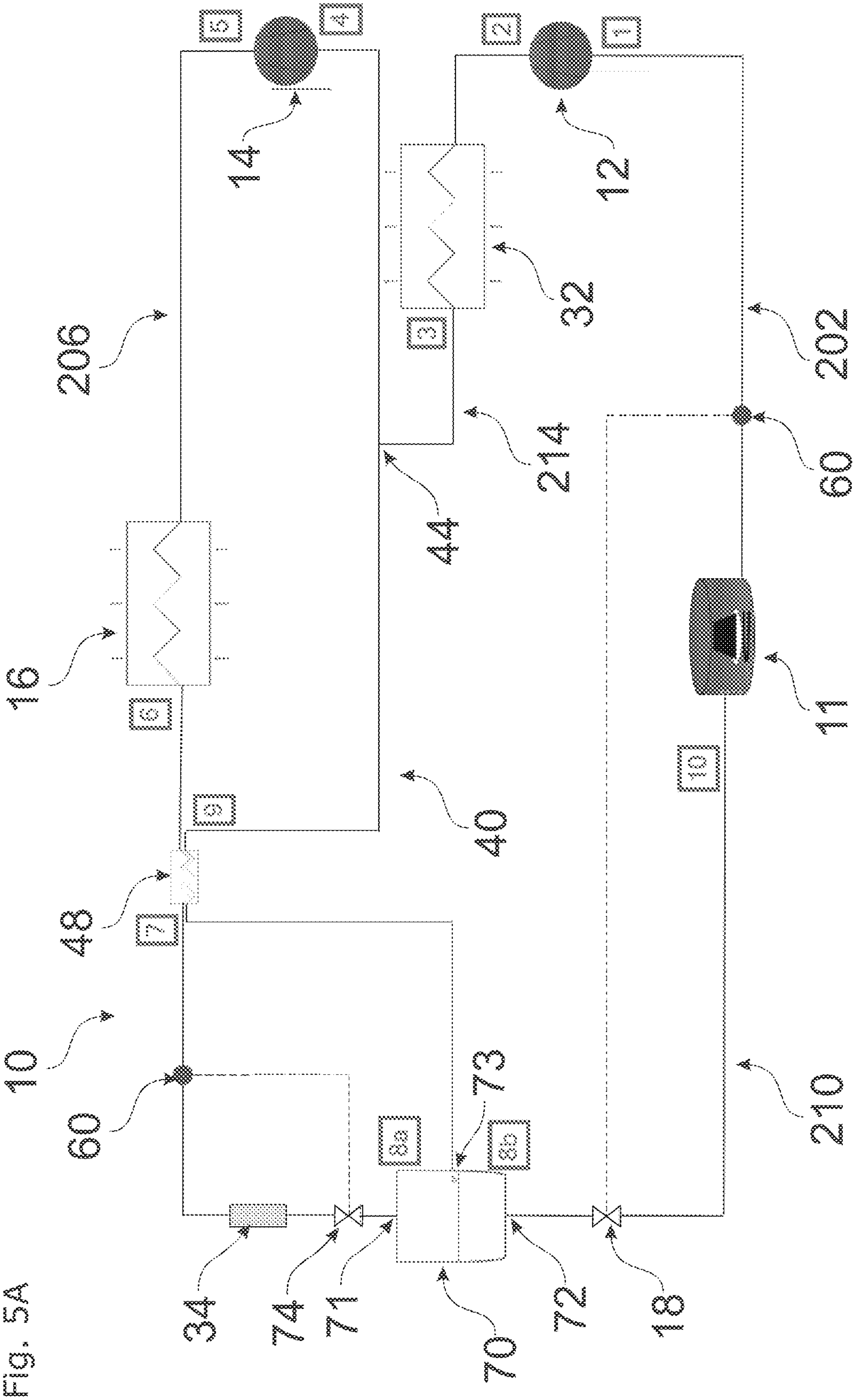
FIG. 5A is a schematic view of a cooling system according to an embodiment.
Figure 5B:
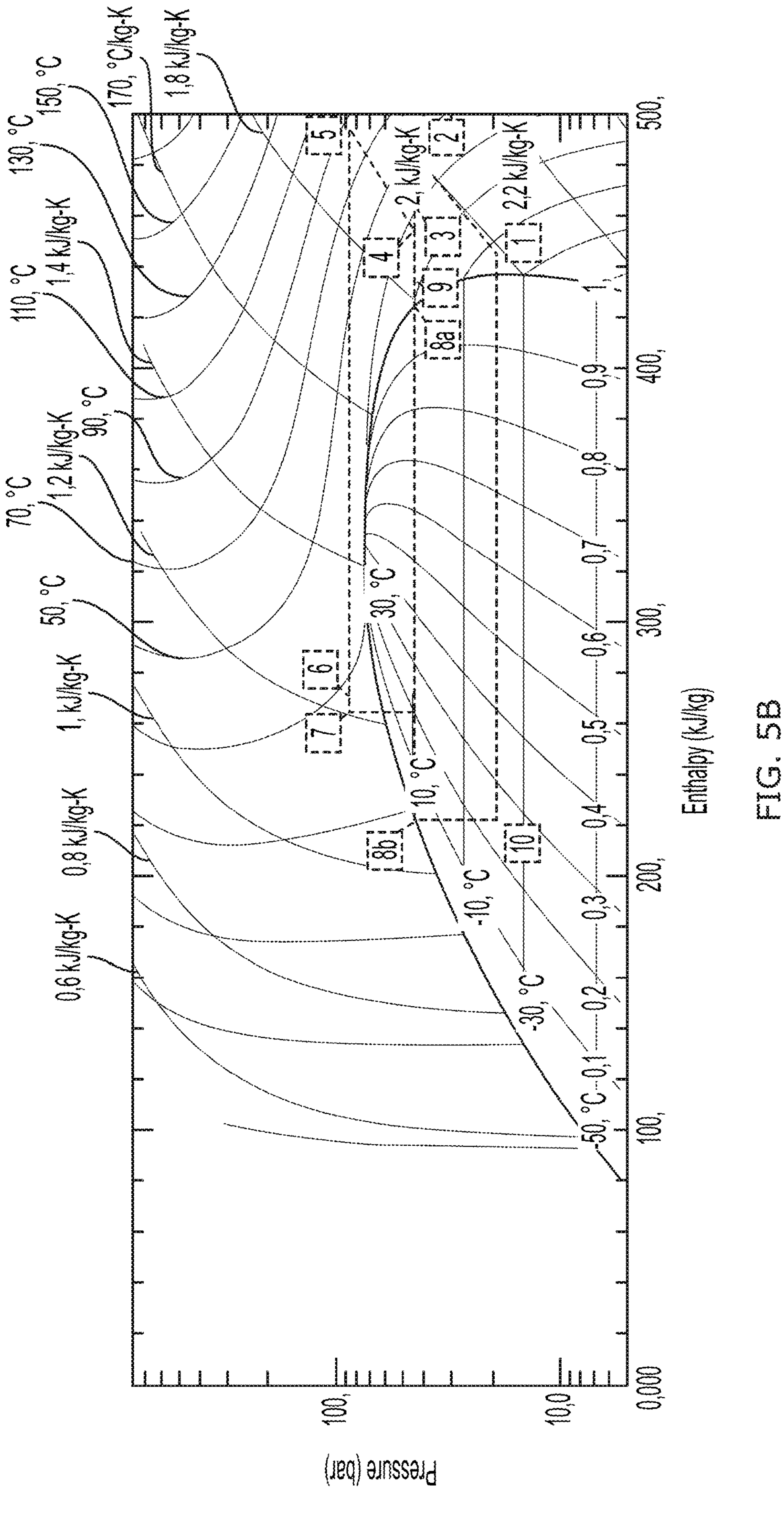
FIG. 5B is an enthalpy-pressure diagram of a cycle of an embodiment of the cooling system according to FIG. 5A.

The embodiment according to FIGS. 5A and 5B is based on the embodiment according to FIG. 4A and is supplemented by the second cooling component 32. In this case, a first cooling of the refrigerant can be achieved between the compressors 12, 14 by the second cooling component 32. A further cooling of the refrigerant can then be achieved by mixing the refrigerant with cooled refrigerant from the return portion at the connection point 44. The second cooling component 32 can be provided with a fan, such that the cooling performance of the second cooling component 32 can be controlled via a fan speed.

Figure 6A:
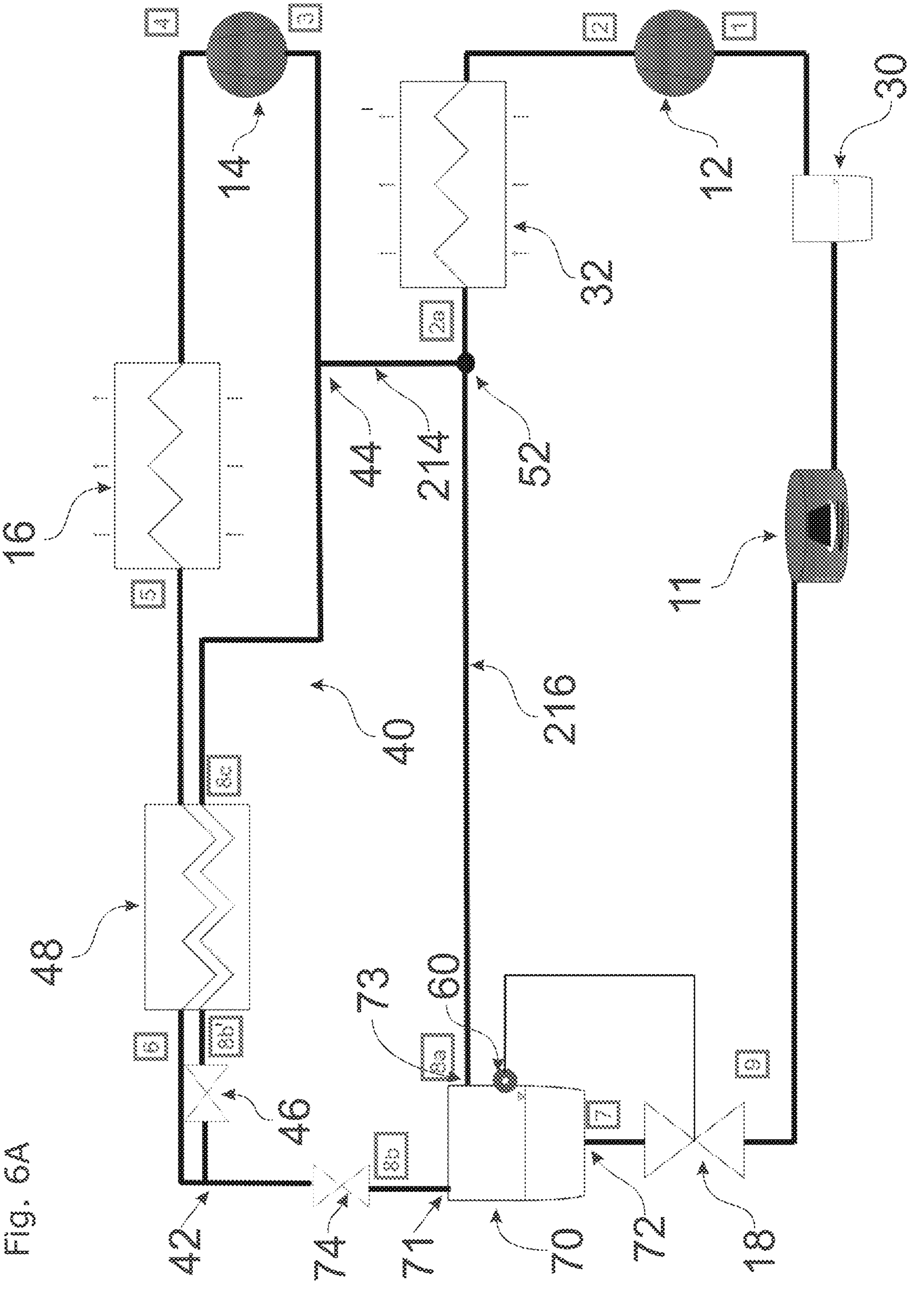
FIG. 6A is a schematic view of a cooling system according to an embodiment.
Figure 6B:
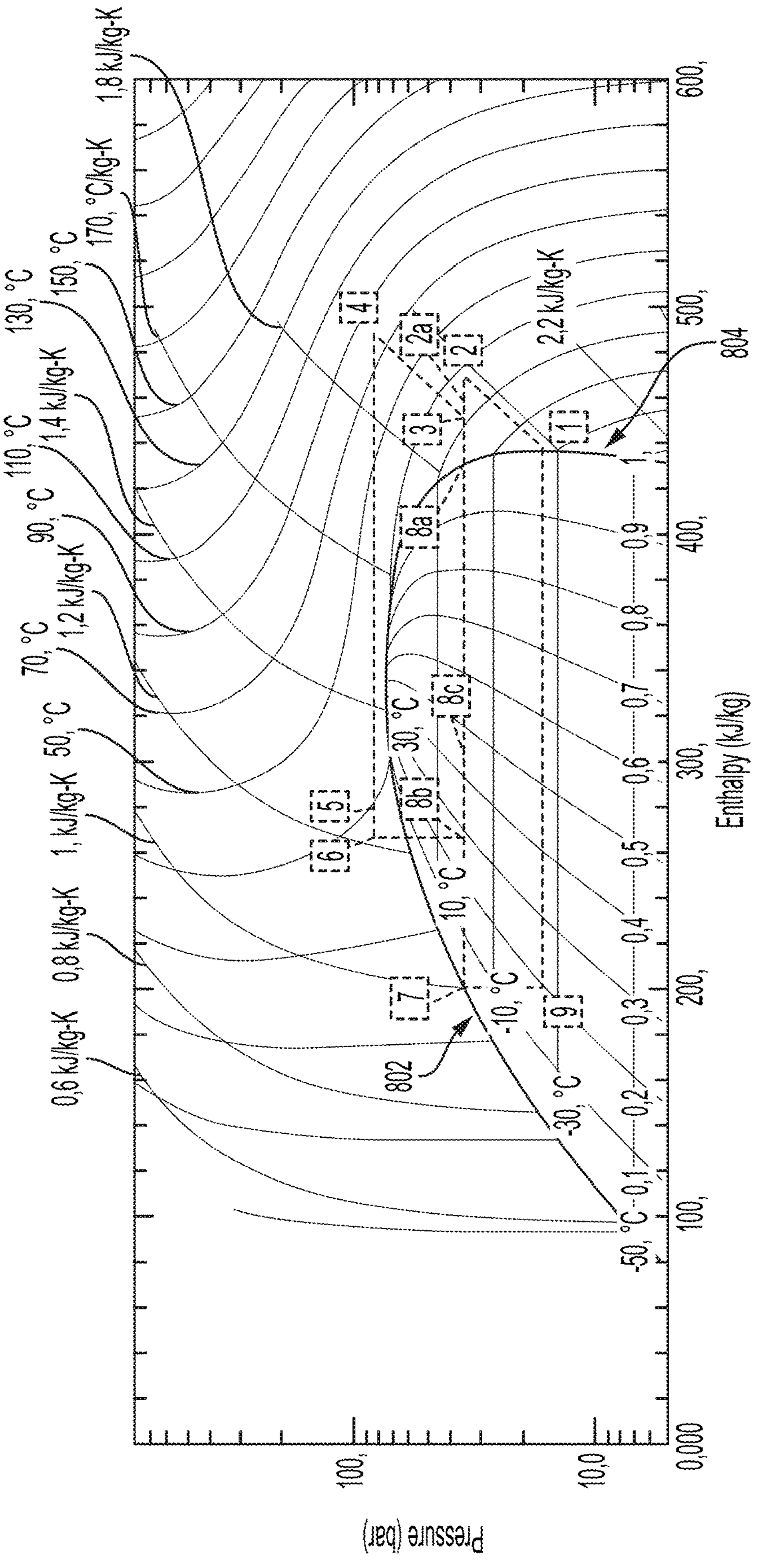
FIG. 6B is an enthalpy-pressure diagram of a cycle of an embodiment of the cooling system according to FIG. 6A.

In a further embodiment of the cooling system 10 according to FIGS. 6A and 6B, the intermediate-pressure vessel 70 can be connected via a line segment 216, which connects the second vessel outlet 73 to a further connection point 52, to the main circuit downstream of the evaporator 11, advantageously downstream of the liquid separator 30, downstream of the first compressor 12 and/or downstream of the second cooling component 32. A first mixed refrigerant flow can flow from the further connection point 52 to the second connection point 44.

The connection point 42 is arranged downstream of the process point 6, where the refrigerant flow splits. A high-pressure control apparatus 74 (e.g. an expansion valve) is arranged in the main circuit downstream of the connection point, and an expansion device 46 is also arranged in the return portion. To simplify the state diagram according to FIG. 6B, it was assumed that the apparatuses 74, 46 expand refrigerant equally, such that the process points arranged downstream of said apparatuses are both labeled 8*b* in FIG. 6B, wherein the process point downstream of the apparatus 46 in FIG. 6A is denoted as 8*b*' but coincides with process point 8*b* in FIG. 6B. However, a person skilled in the art will understand that this is only an example and that the apparatuses 74 and 46 can also be designed differently in other embodiments.

After the expansion of the refrigerant (process point 8*b*, FIG. 6A), the refrigerant flow can be divided into two flows (process points 7 and 8*a*). The expanded refrigerant flow in process point 8*b*', which is then heated via the heat exchanger 48 to process point 8*c*, can be in a wet vapor phase (process point 8*c*). The refrigerant is preferably completely in a gaseous state at process point 8*a*, or on the saturation line 804. The state of the cooling medium can be regulated by the temperature of the heating refrigerant between process points 5 and 6, and the mass flow ratios between process points 5 and 6, and 8*b* and 8*c*. A heat flow into the return portion 40 can be proportional to a thermal coupling surface of the heat exchanger 48. Process point 8*c* can be variable and, for example, also coincide with process point 8*a*.

With the second cooling component 32, the refrigerant can be partially liquid at the further connection point. In order to prevent wet suction, i.e., contact of the second compressor 14 with the liquid phase, corresponding temperature equalization can be implemented via the return portion 44 in order to provide a completely gaseous refrigerant at the inlet of the second compressor 14.

Figure 7:
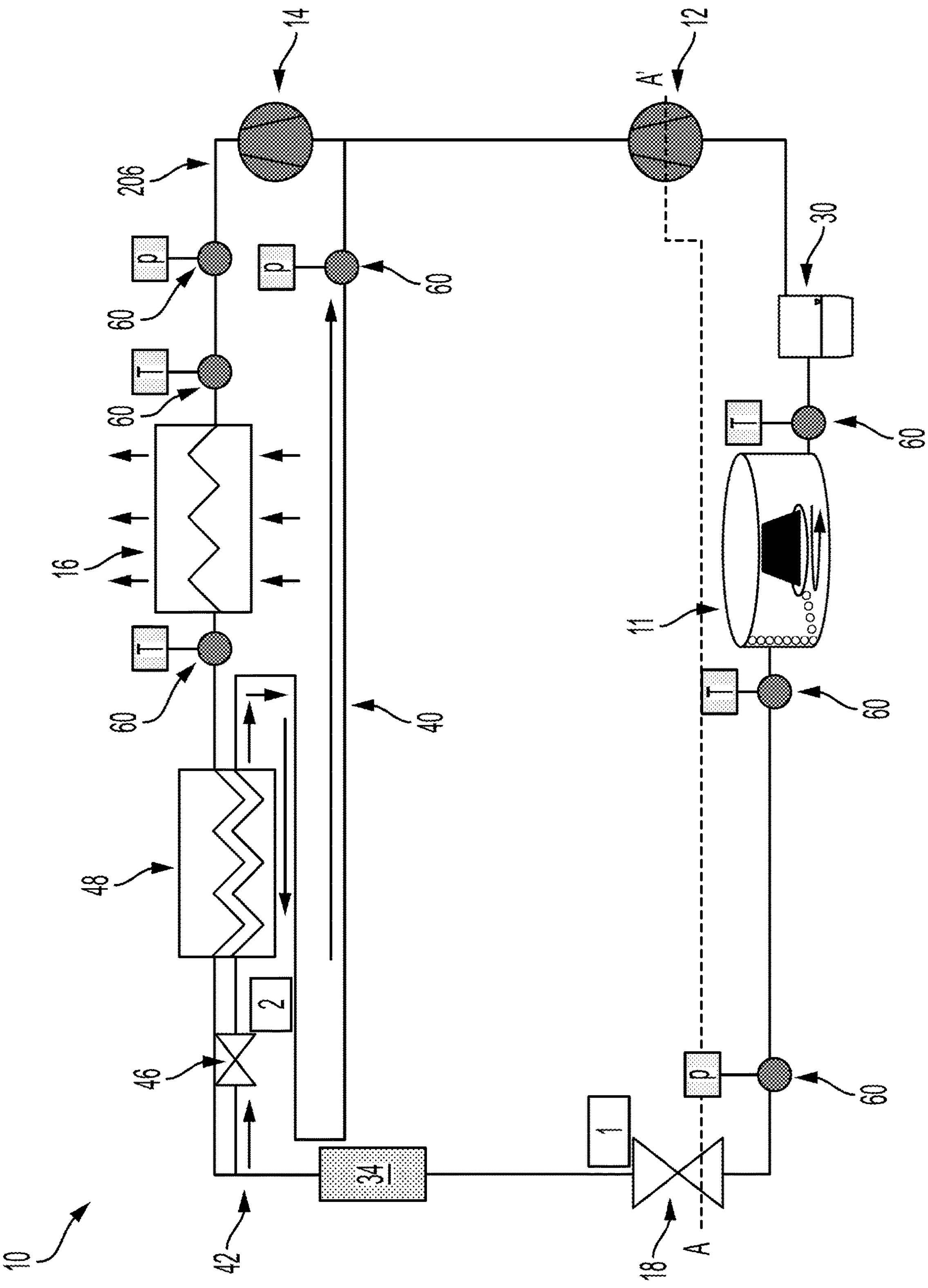
FIG. 7 is a schematic view of a cooling system according to an embodiment.

Three pressure levels can be distinguished in the cooling system. FIG. 7 separates a primary low-pressure region from a secondary intermediate-pressure region with the line A-A'. The low-pressure region is delimited by the outlet of the expansion device 18 and the compressor inlet of the first compressor 12. A tertiary high-pressure region begins with the outlet of the second compressor 14 and extends to the respective pressure reducer in the form of the expansion device 18 and/or the additional expansion device 46. The return portion can have an extended line segment downstream of a secondary side of the heat exchanger 48.

Figure 8:
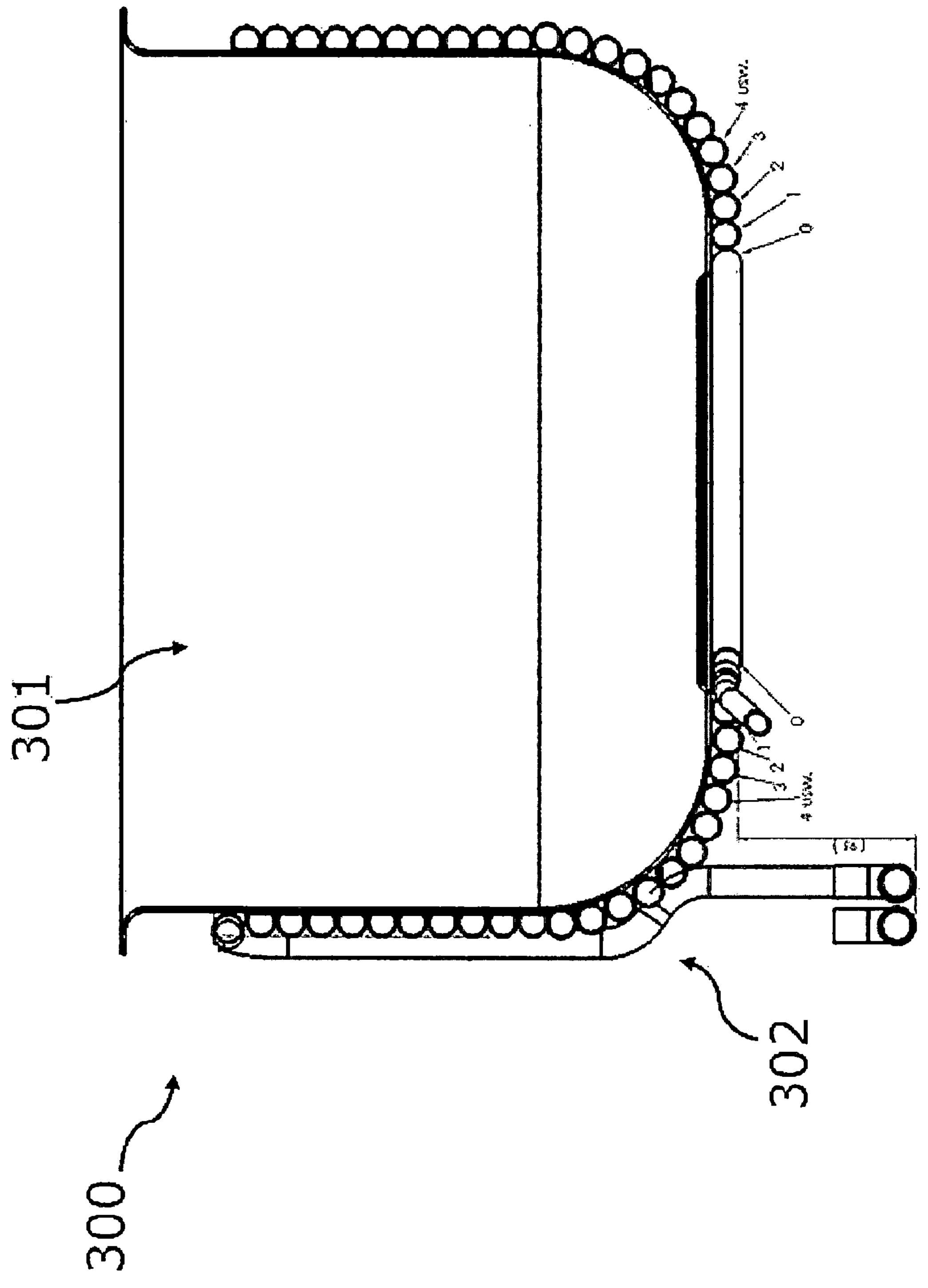
FIG. 8 is a schematic cross-sectional view of a rotor tank according to an embodiment.

The cooling system 10 can be used in a centrifuge 300 to cool a centrifuge bowl 301 (FIG. 8). In this case, an evaporator coil 302 of the evaporator 11 can be arranged with a relatively large surface contact on an outer wall of the centrifuge bowl in order to maximize heat transfer from the rotor interior to the evaporator coil 302. Advantageously, the coils of the evaporator coil 302 can be at least in part pressed onto the rotor tank 301 or at least in part pressed into a flattened shape. In this case, flattened coils of the evaporator coil 302 can be arranged flush with one another on a straight portion of the centrifuge bowl. With the use of $CO_2$ as a refrigerant, a tube diameter of the evaporator coil 302 can be reduced, such that a surface contact between the evaporator coil 302 and the rotor tank 301 can be increased.

Figure 9A:
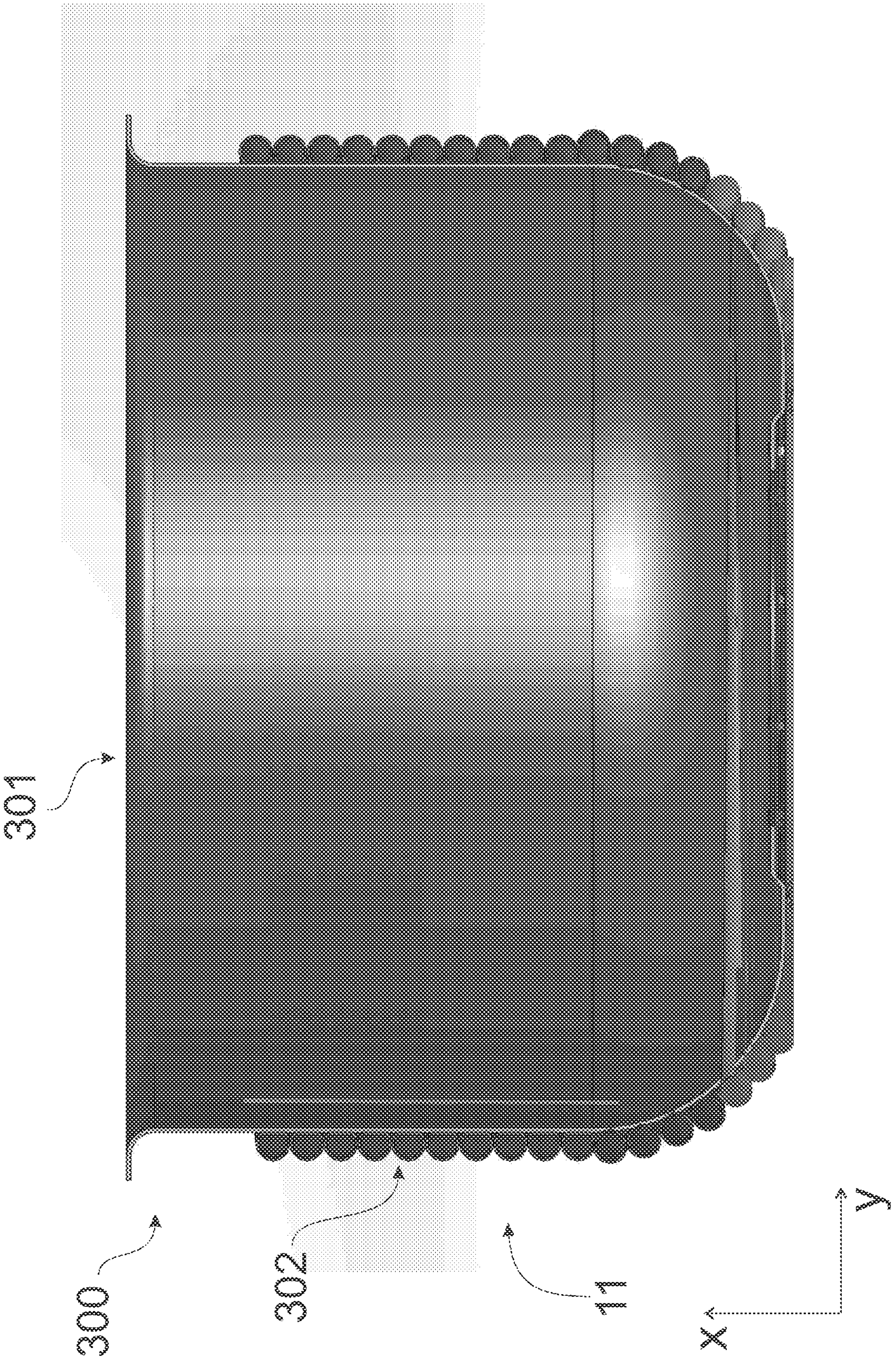
FIG. 9A is a perspective cross-sectional view of a rotor tank according to one embodiment.

According to one embodiment, the evaporator coil 302 can have a tube having an outer tube diameter of 16 mm and a wall thickness of 1 mm, wherein each coil has a contact length in the x-direction of 11.6 mm and wherein the evaporator coil 302 comprises contact coils in a vertical portion in the x-direction 10, resulting in a total length of 116 mm in the X direction (FIG. 9A).

Figure 9B:
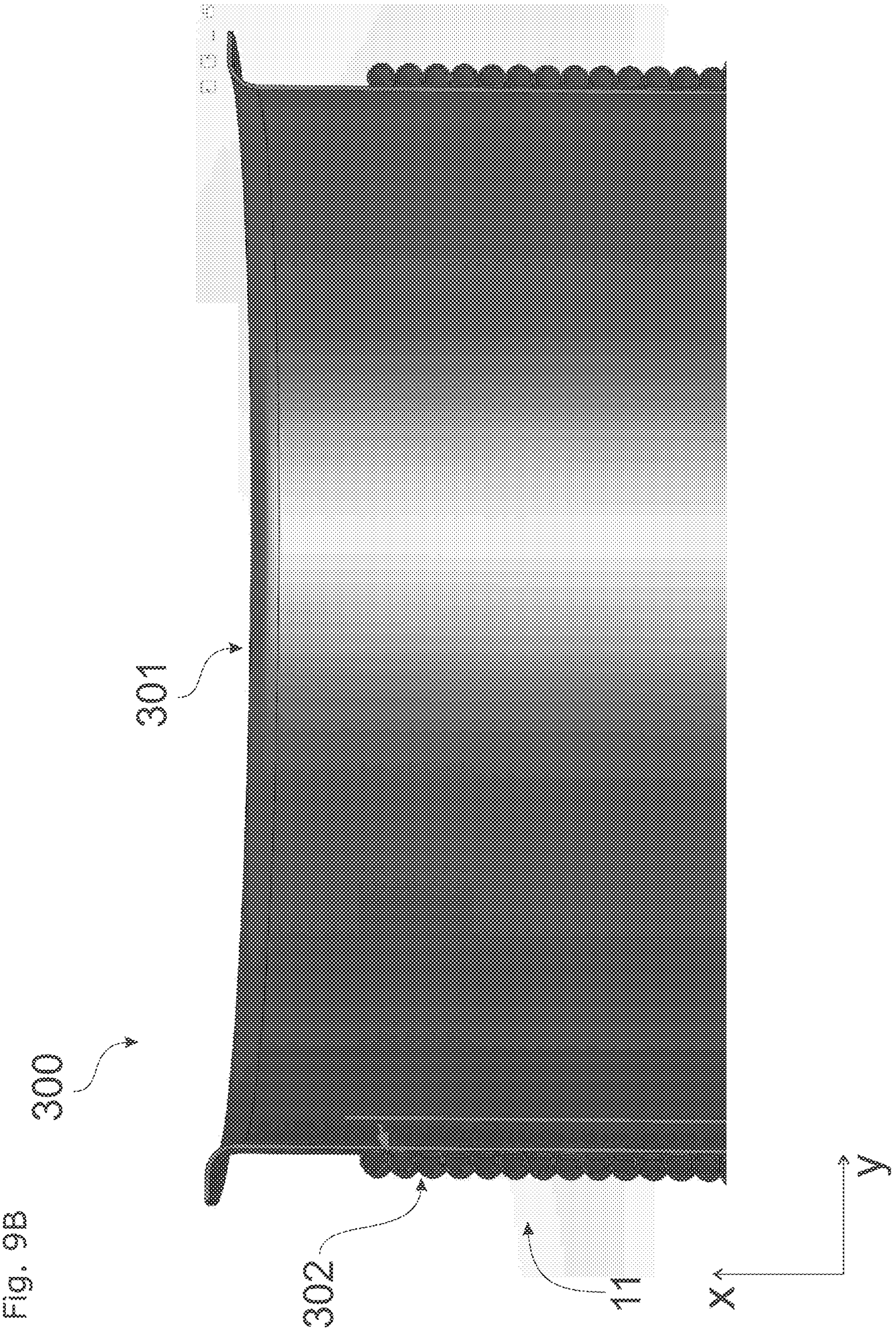
FIG. 9B is a perspective cross-sectional view of a rotor tank according to an embodiment.

According to a further embodiment, the evaporator coil 302 can have a tube having an outer tube diameter of 10 mm and a wall thickness of 1 mm, wherein each coil has a contact length in the x-direction of 8.9 mm and wherein the evaporator coil 302 comprises contact coils in a vertical portion in the x-direction 14, resulting in a total length of 124.6 mm in the x-direction (FIG. 9B).

The increase in the contact surface, as shown in FIG. 9A and FIG. 9B, results in a change in the temperature difference between an inside of the tube and an inside of the tank in the case of a normalized cooling capacity of 2 kW, a normalized U-value of 40 W/($m^2$ K) and an evaporation temperature. The temperature on the inside of the tank approaches the evaporation temperature due to the increase in surface area. For the values assumed above, the temperature difference from the outside of the tube is as follows:

0.216 $m^2$: 9.28 K 0.23 $m^2$: 8.7 K

Accordingly, the temperature at the edge of the tube can be 0.58 K lower due to the increase in surface area, such that the tank temperature can also be reduced. The lower tank temperature results in better sample cooling. Reducing the tube diameter can also result in material savings.

Whenever a relative term such as "approximately," "substantially," or "about" is used in this document, that term is intended to include the exact term as well. That is to say, e.g., "substantially straight" should be construed to also include "(exactly) straight."

Whenever steps are mentioned in this document, it should be noted that the order in which the steps are mentioned in this text can be random. That is, the order in which the steps are presented can be random unless otherwise specified or obvious to a person skilled in the art. That is, if in the present document, for example, it is stated that a method comprises steps (A) and (B), this does not necessarily mean that step (A) occurs before step (B), but it is also possible that step (A) (at least in part) is carried out simultaneously with step (B) or that step (B) occurs before step (A). Furthermore, if it is stated that a step (X) precedes another step (Z), this does not mean that there is no step between steps (X) and (Z). That is, step (X) before step (Z) comprises the situation that step (X) is performed directly before step (Z), but also the situation that (X) is performed before one or more steps (Y1), . . . , followed by step (Z). Corresponding considerations apply when terms such as "after" or "before" are used.

While preferred embodiments have been described above with reference to the drawings, a person skilled in the art will understand that these embodiments have been provided for illustrative purposes only and should in no way be construed as limiting the scope of the present invention which is defined by the claims.

What is claimed:

1. A laboratory instrument having a cooling system, wherein the cooling system comprises:

an evaporator;

a first compressor;

a second compressor;

a cooling component;

an expansion device; and a line system that connects the evaporator, the first compressor, the second compressor, the cooling component and the expansion device to one another, wherein the cooling system comprises a refrigerant, the refrigerant comprising carbon dioxide, wherein the first compressor and the second compressor are arranged in series with one another, and wherein the cooling system comprises a main circuit, and wherein the main circuit includes:

the evaporator, the first compressor, the second compressor, the cooling component, a high-pressure control apparatus, and at least part of the line system, and wherein the refrigerant is present in the main circuit;

wherein the first compressor is designed to compress the refrigerant from a primary pressure range to a secondary pressure range, wherein the secondary pressure range has higher pressures with respect to the primary pressure range;

wherein the second compressor is designed to compress the refrigerant from the secondary pressure range to a tertiary pressure range, wherein the tertiary pressure range has higher pressures with respect to the secondary pressure range;

wherein the high-pressure control apparatus is designed to reduce the pressure of the refrigerant from the tertiary pressure range to the secondary pressure range or to reduce the pressure within the tertiary pressure range, wherein the high-pressure control apparatus is controlled on the basis of a pressure of the refrigerant downstream of the cooling component and upstream of the high-pressure control apparatus.

2. The laboratory instrument according to claim 1, wherein the main circuit comprises the expansion device, and wherein the expansion device is controlled based on a pressure of the refrigerant downstream of the evaporator and upstream of the first compressor.

3. The laboratory instrument according to claim 2, wherein the cooling system comprises an intermediate-pressure vessel configured to divide the refrigerant into a liquid phase and a gas phase, and wherein the intermediate-pressure vessel is arranged in the main circuit upstream of the expansion device.

4. The laboratory instrument according to claim 1, wherein the laboratory instrument is a centrifuge.

5. The laboratory instrument according to claim 1, wherein the cooling system is configured in such a way that, when the refrigerant leaves the first compressor at an outlet temperature, the refrigerant is fed to the second compressor at an inlet temperature that is lower than the outlet temperature.

6. The laboratory instrument according to claim 1, further comprising a heat exchanger, wherein the heat exchanger comprises a primary side that is arranged in the main circuit downstream of the cooling component, and wherein the heat exchanger is designed to cool the refrigerant in the main circuit.

7. The laboratory instrument according to claim 6, wherein the cooling system has a return portion that is fluidically connected to the main circuit.

8. The laboratory instrument according to claim 7, wherein the return portion is fluidically connected to the main circuit at a first connection point and a second connection point.

9. The laboratory instrument according to claim 8, wherein the heat exchanger is designed to provide the refrigerant at a predetermined temperature below an outlet temperature of the cooling component at the first connection point and/or in a line portion, wherein the heat exchanger comprises a secondary side, and wherein the heat exchanger is designed to absorb heat from the refrigerant by means of the primary side and to release the absorbed heat to the refrigerant by means of the secondary side in order to heat the refrigerant in the return portion.

10. The laboratory instrument according to claim 9, wherein the secondary side of the heat exchanger is arranged in the return portion.

11. The laboratory instrument according to claim 1, further comprising an intermediate-pressure vessel that is designed to divide the refrigerant into a liquid phase and a gas phase, wherein the intermediate-pressure vessel is arranged in the main circuit downstream of the cooling component and/or upstream of the expansion device.

12. The laboratory instrument according to claim 7, wherein the intermediate-pressure vessel is designed as a three-way accumulator and comprises:

a vessel inlet that is designed to conduct refrigerant into the intermediate-pressure vessel and arranged downstream of the cooling component;

a first vessel outlet that is designed to conduct liquid refrigerant from the intermediate-pressure vessel into the line system and arranged upstream of the evaporator and/or upstream of the expansion device;

a second vessel outlet that couples the intermediate-pressure vessel to the return portion and is designed to conduct gaseous refrigerant into the return portion.

* * * * *